US012771547B2

(12) United States Patent
Chen et al.

(10) Patent No.: US 12,771,547 B2
(45) Date of Patent: Oct. 20, 2026

(54) CONTENTION-BASED DISCOVERY AND SECURE RANGING TECHNIQUES FOR CONGESTED ENVIRONMENTS

(71) Applicant: APPLE INC., Cupertino, CA (US)

(72) Inventors: Qiang Chen, Freemont, CA (US); Robert W. Brumley, San Jose, CA (US); Robert Golshan, San Francisco, CA (US); Jinjing Jiang, Campbell, CA (US)

(73) Assignee: APPLE INC., Cupertino, CA (US)

( * ) Notice: Subject to any disclaimer, the term of this patent is extended or adjusted under 35 U.S.C. 154(b) by 428 days.

(21) Appl. No.: 17/931,072

(22) Filed: Sep. 9, 2022

(65) Prior Publication Data

US 2023/0353365 A1 Nov. 2, 2023

Related U.S. Application Data

(60) Provisional application No. 63/363,705, filed on Apr. 27, 2022.

(51) Int. Cl.
*H04L 9/32* (2006.01)
*H04L 9/08* (2006.01)

(52) U.S. Cl.
CPC .......... *H04L 9/3226* (2013.01); *H04L 9/0825* (2013.01); *H04L 9/3297* (2013.01)

(58) Field of Classification Search
CPC .... H04L 9/3226; H04L 9/0825; H04L 9/3297
USPC .......................................................... 713/168
See application file for complete search history.

(56) References Cited

U.S. PATENT DOCUMENTS

| | | | | |
|---|---|---|---|---|
| 11,057,743 | B2 | 7/2021 | Burowski et al. | |
| 11,082,809 | B1 * | 8/2021 | Burowski | H04W 80/02 |
| 2018/0167367 | A1 * | 6/2018 | John | H04L 9/0825 |
| 2019/0098499 | A1 * | 3/2019 | Lerch | G06Q 20/3821 |
| 2021/0072373 | A1 * | 3/2021 | Schoenberg | G01S 13/878 |

(Continued)

OTHER PUBLICATIONS

International Search Report and Written Opinion issued in PCT Application No. PCT/US2023/019860, dated Aug. 1, 2023 in 12 pages.

(Continued)

*Primary Examiner* — Jeffrey C Pwu
*Assistant Examiner* — Samuel Ambaye
(74) *Attorney, Agent, or Firm* — Kilpatrick Townsend & Stockton LLP

(57) ABSTRACT

A mobile device may receive a plurality of polling messages with each polling message including an identifier of a particular access device transmitting the polling message. Each polling message of the plurality of polling messages may be transmitted during a polling phase. The mobile device may select a timeslot of a response phase of a communication session. The mobile device may transmit a response message during the timeslot of the response phase. The mobile device may receive, during a third phase, an assignment message including an assigned timeslot for a response phase of a future session. The mobile device may perform secure ranging with one or more access devices of the plurality of access devices during the future session using the assigned timeslot. The mobile device may provide an access credential to the one or more access devices based on a location determined using the secure ranging.

40 Claims, 16 Drawing Sheets

(56) References Cited

U.S. PATENT DOCUMENTS

| | | | | |
|---|---|---|---|---|
| 2021/0076163 | A1* | 3/2021 | Burowski | H04W 4/08 |
| 2022/0078578 | A1* | 3/2022 | Brumley | G01S 13/767 |

OTHER PUBLICATIONS

International Preliminary Report on Patentability issued in PCT Application No. PCT/US2023/019860, dated Nov. 7, 2024 in 9 pages.

* cited by examiner

700

900

CONTENTION-BASED DISCOVERY AND SECURE RANGING TECHNIQUES FOR CONGESTED ENVIRONMENTS

CROSS-REFERENCES TO RELATED APPLICATIONS

This application claims the benefit to U.S. Provisional Application No. 63/363,705, filed Apr. 27, 2022, entitled "Contention-Based Discovery And Secure Ranging Techniques For Congested Environments," the disclosures which is incorporated by reference in its entirety and for all purposes.

FIELD

The present disclosure relates generally to techniques for using communication devices to conduct ranging and access control.

BACKGROUND

Access control is the problem of managing admission to a restricted area. Authorized persons can be granted access to the restricted area by authenticating a credential at an entryway. Authenticating credentials for a crowd, in aggregate, can be a time-consuming process because of the scale involved. For instance, the Tokyo Metro has 8,700,000 daily riders for its subway system.

To be practical, a credential authentication method should balance efficiency and security. Physical credentials, such as a magnetic stripe card or near field communication (NFC) card, can be secure and private. However, physical credentials are inefficient. A user can misplace their credential, slowing access through an entryway, and presenting the credential can be a time consuming compared to other methods.

Contactless authentication, such as facial recognition or wireless communication, suffers from privacy and reliability issues. Privacy concerns may cause authorized users to resist using facial recognition, and these concerns may be pronounced if a government agency, such as a transit authority, is performing access control. Wireless messages from a mobile device (e.g., a watch or a phone) can be used, but such messages can collide in a crowded environment and establishing a secure channel in a one-to-many scenario can be challenging. Further, body attenuation, or interference caused by a wireless message passing through the human body (e.g., if the electronic device is in a back pocket or purse), can become a significant issue in a crowded environment. Accordingly, improvements to wireless access control are desirable.

BRIEF SUMMARY

Certain embodiments are directed to techniques (e.g., a device, a method, a memory or non-transitory computer readable medium storing code or instructions executable by one or more processors) for access control techniques.

One general aspect can include a method for communicating with an access device. The method can include receiving a plurality of polling messages. Each polling message can include an identifier of a particular access device that transmitted the polling message during a polling phase. The method can include selecting a timeslot of a response phase of a communication session. The method can include transmitting a response message during the timeslot of the response phase. The method can include receiving an assignment message including an assigned timeslot for a response phase of a future session. The assignment message can be received during a third phase. The method can include performing secure ranging with access devices during the future session using the assigned timeslot. The method can include providing an access credential to access devices based on a location determined using the secure ranging. Other embodiments of this aspect can include corresponding computer systems, apparatus, and computer programs recorded on one or more computer storage devices, each configured to perform the actions of the methods.

Implementations may include one or more of the following features. The method may include: contention-based discovery of mobile devices, whereby each mobile device can receive a plurality of polling messages from multiple access devices (e.g., gates); each mobile device can send a response message within a randomly-selected timeslot; timeslots can be further divided into mini-slots, such that on each mini-slot of the timeslot, a different access device may listen for responses from the mobile devices; each mobile device can direct its response message to a particular access device by sending its response in the appropriate mini-slot within the timeslot. The response message may include a public key of the mobile device. A secure channel can be established between the mobile device and access devices using their corresponding public keys. A third message from each access device may broadcast timeslot assignments for individual mobile devices to use during the secure ranging portion of the protocol. Implementations of the described techniques may include hardware, a method or process, or computer software on a computer-accessible medium.

One general aspect includes a method for secure ranging. The method can include receiving scheduling messages from a plurality of access devices. The scheduling messages can identify an assigned response-slot of a future ranging session. The method can include receiving a polling message from a plurality of access devices. The polling messages can include access device identification information. The method can include determining a reception time (or a transit time) of the scheduling message for the access devices. The method can include transmitting a response message during the assigned response-slot. The response message including a mobile device identifier and one or more reception times for scheduling messages. The method can include receiving an access message from an access device. The access message can include a distance between the mobile device and the first access device. The method can include providing an access credential to the first access devices based on the information indicating the distance. Other embodiments of this aspect include corresponding computer systems, apparatus, and computer programs recorded on one or more computer storage devices, each configured to perform the actions of the methods.

Implementations may include one or more of the following features. The method where the response message is encrypted with an access device public-key. The method may include decrypting the access message using a private-key of the mobile device. The information indicating the distance can include the distance as determined by the first access device. Implementations of the described techniques may include hardware, a method or process, or computer software on a computer-accessible medium.

A better understanding of the nature and advantages of embodiments of the present invention may be gained with reference to the following detailed description and the accompanying drawings.

DETAILED DESCRIPTION OF THE INVENTION

Figure 1:
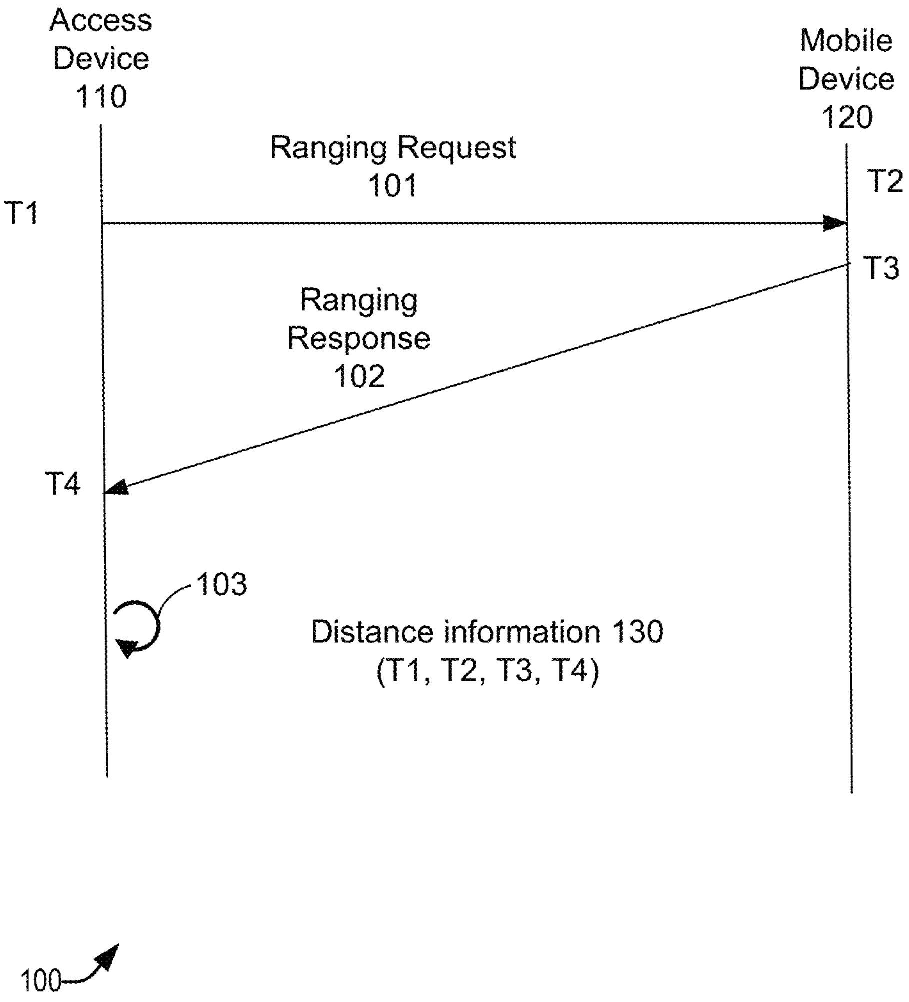
FIG. 1 shows a sequence diagram for performing a ranging measurement between an access device and a mobile device according to embodiments of the present disclosure.

Certain embodiments are directed to techniques (e.g., a device, a method, a memory or non-transitory computer readable medium storing code or instructions executable by one or more processors) for discovery or ranging techniques.

Wireless access control can be performed in a congested environment using many-to-many secure ranging techniques. During a contention-based discovery process, mobile devices can be discovered by a number of access devices (e.g., gates) and assigned timeslots for performing future rounds of secure ranging. Keys for the secure ranging can also be established during the discovery phase.

The discovery can have three phases. The first (polling) phase involves transmitting a polling message from the access devices. The polling message of an access device can include a public key of the access device. The public key can act as an identifier of the access device, or the polling message can include a separate identifier. Such a public key can be used for encryption during secure ranging.

The mobile devices can respond during the response phase, which may be subdivided into timeslots (e.g., access slots), each potentially further divided into portions of the timeslot, called min-slots. The mobile devices can randomly choose a timeslot. As long as the number of timeslots is large enough, then the chances of collision can be low. As a further mechanism to avoid collisions, the timeslots can be further divided or organized such that each timeslot has mini-slots, each of which is designated for a particular access device. The mobile device can select the particular mini-slot assigned to the access device whose polling message had the highest signal strength. The response message can include the public key of the mobile device.

A schedule of the polling messages can be known, e.g., when each access device is scheduled to transmit a message, such as a polling message, or scheduled to receive a message, such as an assigned mini-slot. Scheduling information can include a schedule of the three phases (e.g., start and stop times), timings of polling signals, timeslots including mini-slots assigned to a particular access device, and timings of other messages during any of the phases. Such a schedule can be obtained before the discovery phase, e.g., from a separate beacon device or downloaded from a server. The selection of a particular mini-slot can be performed based on a proximity measurement, such as signal strength or time-of-flight. In one example, the time difference of arrival (TDoA) from the schedule transmission time for the polling signals can be used to determine which access device is closest. The response message can be sent to the particular access device that is closest or has the strongest signal.

When used, a mini-slot may be selected using various criteria, e.g., proximity or other than proximity or at least one or more criteria that do not correspond to proximity. For example, the highest signal strength may not correspond to the closest access device. For instance, the closest access device may be in front of a person. However, if the mobile device, such as a cell phone, is in a person's back pocket, it may not be efficient to communicate with the closest device. The mobile device may be pointed away from the closest access device, and, consequently another access device may be chosen. Signal attenuation (e.g., body attenuation) caused by messages passing through the person's body, or the bodies of people in the crowded environment, can mean that the response message is sent to the particular access device with the strongest signal strength.

During a third (potentially final) phase, the access devices assign timeslots to specific mobile devices for performing secure ranging and provide assignments to the mobile devices in an assignment message. The assignment message can include a device identifier indicating the message is for a particular mobile device or for multiple mobile devices. In effect, a mobile device can be assigned a particular timeslot for performing secure ranging with one or more access devices. The mobile device can be assigned one or more timeslots for secure ranging. For example, a mobile device can be assigned a first timeslot for performing secure ranging with one or more access devices and can be assigned a second timeslot to perform secure ranging with one or more additional access devices.

During secure ranging, assigned access devices may listen, during the assigned timeslot, for messages from the mobile device, and the mobile device can communicate with available access devices. The assignment message can also specify with which access device(s) the mobile device should perform secure ranging. This target subset of one or more access devices can include the access device selected by the mobile device (e.g., based on message strength of the corresponding polling message) and based on a message (e.g., signal) strength of the response messages, as determined by access devices. In this way, additional access devices can be identified for secure ranging. Alternatively, both access devices on either side of the selected target access device can automatically be used for the secure ranging. The assignment message can be sent by the access device that received the response.

The necessary keys (e.g., a public key of the access device) to establish secure ranging could be sent in the third phase or could be exchanged during the assigned timeslot for a ranging session. If the latter, a first ranging session might only include an exchange of keys. As another example, any of the keys can be sent using Bluetooth.

Once the keys are exchanged, a mobile device can be localized using secure ranging. During secure ranging, access devices may listen, during the assigned timeslot, for messages from the mobile device, and the mobile device can communicate with available access devices. Ranging messages (which may be encrypted) are exchanged between the mobile devices and multiple access devices. The ranging can be performed in three phases, as in the contention-based discovery. The polling messages can be the same as for the discovery phase. In some embodiment, the final phase during contention-based discovery can be used as the polling phase for secure ranging. In response, the mobile device can transmit a ranging message at an assigned timeslot.

Contention based discovery and secure ranging can be performed sequentially. For instance, a single access device, during 3 Hertz (Hz) ranging may repeat a ranging/discovery cycle every 333 milliseconds (ms). A 33 ms segment can be dedicated to time synchronization with beacons. A 150 ms segment can be used for contention-based discovery, and a separate 150 ms segment can be used for secure ranging. This ranging/discovery cycle can be in sync by one or more access devices (e.g., all access devices performing secure ranging at the same time), or multiple access devices can perform the cycle at staggered intervals (e.g., one access device is performing ranging while another is performing discovery).

The response message can be a single message sent at the assigned timeslot and can be received by any of the access devices; the response message can include the reply time (i.e., difference between transmission time of response message and received time of the polling message) needed for ranging. Alternatively, a mobile device can send reply times associated with multiple access devices in a single response message.

One or more access devices (gates) can receive the response ranging message allowing the mobile device's distance to multiple points of reference to be calculated, potentially from one response message. In addition, passive devices (also referred to as receive (RX) access devices or a passive receiver) can be installed at or near an access device to receive the response messages from the assigned mobile devices, and the time-difference of arrival (TDoA) between passive devices can be used to calculate the position (e.g., 2D or 3D position) on the mobile device. A message from the access devices can provide information to the mobile devices, e.g., to trigger sending a credential when the distance is short enough. Alternatively, a final message can include a trigger to send the credential. Once the mobile device is determined to be in an entryway of a particular access device, the mobile device can transmit credentials to the particular access device, which can verify the credential and grant access.

An aspect of the above process is the assignment of each of multiple mobile devices to a particular timeslot for secure ranging by a set of access devices. Since the access devices all agree that a given timeslot is assigned to a particular mobile device, secure ranging can be performed between multiple access devices and multiple mobile devices in a more efficient manner.

I. Ranging

In some embodiments, a mobile device or an access device can include circuitry for performing ranging measurements. Such circuitry can include one or more dedicated antennas (e.g., 3) and circuitry for processing measured messages (e.g., signals). The ranging measurements can be performed using the time-of-flight of pulses between the two mobile devices. In some implementations, a round-trip time (RTT) is used to determine distance information, e.g., for each of the antennas. In other implementations, a single-trip time in one direction can be used. The pulses may be formed using ultra-wideband (UWB) radio technology.

A. Sequence Diagram

FIG. 1 shows a sequence diagram for performing a ranging measurement between an access device and a mobile device according to embodiments of the present disclosure. The access device can be a part of infrastructure for controlling access to a restricted area. The mobile device can be a smartphone, a smartwatch, a tablet computer, etc. Although FIG. 1 shows a single measurement, the process can be repeated to perform multiple measurements over a time interval as part of a ranging session, where such measurements can be averaged or otherwise analyzed to provide a single distance value, e.g., for each antenna. FIG. 1 illustrates a message sequence of a single-sided two-way ranging protocol. The techniques presented in this application are also applicable to other ranging protocols such as double-sided two way ranging.

Access device 110 can initiate a ranging measurement (operation) by transmitting a ranging request 101 to a mobile device 120 (e.g., a smartphone, a smartwatch). Ranging request 101 can include a first set of one or more pulses. The ranging measurement can be performed using a ranging wireless protocol (e.g., ultrawide band (UWB)). The ranging measurement may be triggered in various ways, e.g., based on user input and/or authentication using another wireless protocol, e.g., Bluetooth low energy (BLE). In one example, ranging can start upon receiving certain information in an advertisement signal from a beacon device.

At $T_1$, access device 110 transmits ranging request 101. At $T_2$, mobile device 120 receives ranging request 101. $T_2$ can be an average received time when multiple pulses are in the first set. Mobile device 120 can be expecting ranging request 101 within a time window based on previous communications, e.g., using another wireless protocol. The ranging wireless protocol and the another wireless protocol can be synchronized so that mobile device 120 can turn on the ranging antenna(s) and associated circuitry for a specified time window, as opposed to leaving them on for an entire ranging session.

In response to receiving the ranging request 101, mobile device 120 can transmit ranging response 102. As shown, ranging response 102 is transmitted at time $T_3$, e.g., a transmitted time of a pulse or an average transmission time for a set of pulses. $T_2$ and $T_3$ may also be a set of times for respective pulses. Ranging response 102 can include times $T_2$ and $T_3$ so that access device 110 can compute distance information. As an alternative, a delta between the two times (e.g., $T_3-T_2$) can be sent. The delta can be referred to as a reply time.

At $T_4$, access device 110 can receive ranging response 102. Like the other times, $T_4$ can be a single time value or a set of time values.

At 103, access device 110 computes distance information 130, which can have various units, such as distance units (e.g., meters) or as a time (e.g., milliseconds). Time can be equivalent to a distance with a proportionality factor corresponding to the speed of light. In some embodiments, a distance can be computed from a total round-trip time, which may equal $T_2$-$T_1$+$T_4$-$T_3$. More complex calculations can also be used, e.g., when the times correspond to sets of times for sets of pulses and when a frequency correction is implemented.

B. Triangulation

In some embodiments, a mobile device can have multiple antennas, e.g., to perform triangulation. The separate measurements from different antennas can be used to determine a two-dimensional (2D) position, as opposed to a single distance value that could result from anywhere on a circle/sphere around the mobile device. The two-dimensional position can be specified in various coordinates, e.g., Cartesian or polar, where polar coordinates can comprise an angular value and a radial value.

Figure 2:
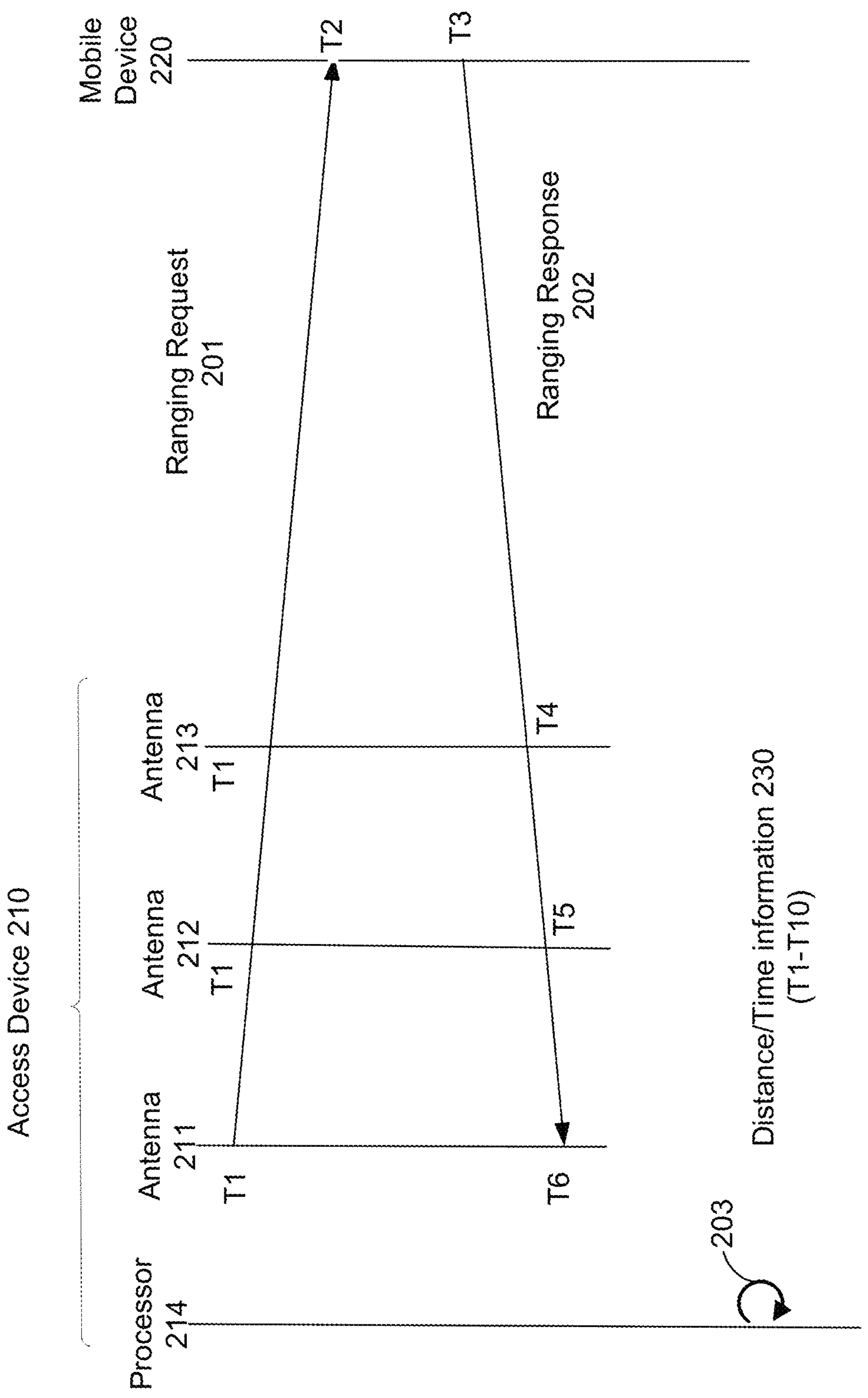
FIG. 2 shows a sequence diagram of a ranging operation involving an access device having three antennas according to embodiments of the present disclosure.

FIG. 2 shows a sequence diagram of a ranging operation involving an access device 210 having three antennas 211-213 according to embodiments of the present disclosure. Antennas 211-213 can be arranged to have different orientations, e.g., to define a field of view for performing ranging measurements. FIG. 2 illustrates a message sequence of a single sided two-way ranging protocol. The techniques presented in this application are also applicable to other ranging protocols such as double-side two way ranging.

In this example of FIG. 2, antenna 211 transmits a packet (including one or more pulses) that is received by mobile device 220. This packet can be part of ranging requests 201.

In some embodiments, access device 210 can have multiple antennas itself. In such an implementation, an antenna of access device 210 can send a packet to a particular antenna (as opposed to a broadcast) of mobile device 220, which can respond to that particular packet. Mobile device 220 can listen at a specified antenna so that both devices know which antennas are involved, or a packet can indicate which antenna a message is for. For example, a first antenna can respond to a received packet; and once the response is received, another packet can be sent to a different antenna. Such an alternative procedure may take more time and power.

The packet of ranging requests 201 are received at time $T_2$. In some instances, the antenna(s) (e.g., ultrawideband (UWB) antennas) of mobile device 220 can listen at substantially the same time and respond independently. Mobile device 220 provides ranging response 202, which is sent at time $T_3$. Access device 210 can receive the ranging response at one or more of antennas 211, 212, 213. Access device 210 receives the ranging responses at times $T_4$, $T_5$, and $T_6$, respectively.

At 203, processor 214 of access device 210 computes distance information 230, e.g., as described herein. Processor 214 can receive the times from the antennas, and more specifically from circuitry (e.g., UWB circuitry) that analyzes messages from antennas 211-213. As described later, processor 214 can be an always-on-processor that uses less power than an application processor that can perform more general functionality. Distance information 230 can be used to determine a 2D or 3D position of mobile device 220, where such position can be used to configure a display screen of mobile device 220. For instance, the position can be used to determine the location of mobile device 220 in a congested environment, e.g., the position relative to one or more access devices (e.g., access device 210), the position of a mobile device in a line, a position relative to an entryway, a position in a 2D grid, the position of mobile device 220 in 1D, 2D, or 3D distance/position ranges.

In some embodiments, to determine which ranging response is from which antenna, mobile device 220 can inform access device 210 of the order of response messages that are to be sent, e.g., during a ranging setup handshake, which may occur using another wireless protocol. In other embodiments, the ranging responses can include identifiers, which indicate which antenna sent the message. These identifiers can be negotiated in a ranging setup handshake.

Messages in ranging requests 201 and ranging responses 202 can include very little data in the payload, e.g., by including few pulses. Using few pulses can be advantageous. The environment of a mobile device (potentially in a pocket) can make measurements difficult. In some instances, larger payloads, such as a payload containing the response time of multiple access devices, are contemplated. As another example, an antenna of one device might face a different direction than the direction from which the other device is approaching. Thus, it is desirable to use high power for each pulse, but there are government restrictions (as well as battery concerns) on how much power can be used within a specified time window (e.g., averaged over 1 millisecond). The packet frames (e.g., ranging frames) containing these messages can be on the order of 130 to 310 microseconds long.

C. Ultra-Wide Band (UWB)

The wireless protocol used for ranging can have a narrower pulse (e.g., a narrower full width at half maximum (FWHM)) than a first wireless protocol (e.g., Bluetooth) used for initial authentication or communication of ranging settings. In some implementations, the ranging wireless protocol (e.g., UWB) can provide distance accuracy of 5 cm or better. In various embodiments, the frequency range can be between 3.1 to 10.6 Gigahertz (GHz). Multiple channels can be used, e.g., one channel at 6.5 GHz another channel at 8 GHz. Thus, in some instances, the ranging wireless protocol does not overlap with the frequency range of the first wireless protocol (e.g., 2.4 to 2.485 GHz).

The ranging wireless protocol can be specified by IEEE 802.15.4, which is a type of UWB. Each pulse in a pulse-based UWB system can occupy the entire UWB bandwidth (e.g., 500 megahertz (MHz)), thereby allowing the pulse to be localized in time (i.e., narrow width in time, e.g., 0.5 ns to a few nanoseconds). In terms of distance, pulses can be less than 60 cm wide for a 500 MHz-wide pulse and less than 23 cm for a 1.3 GHz-bandwidth pulse. Because the bandwidth is so wide and width in real space is so narrow, very precise time-of-flight measurements can be obtained.

Each one of ranging messages (also referred to as frames or packets) can include a sequence of pulses, which can represent information that is modulated. Each data symbol in a frame can be a sequence. The packets can have a preamble that includes header information, e.g., of a physical layer and a MAC layer, and may include a destination address. In some implementations, a packet frame can include a synchronization part and a start frame delimiter, which can line up timing.

A packet can include how security is configured and include encrypted information, e.g., an identifier of which antenna sent the packet. The encrypted information can be used for further authentication. However, for a ranging operation, the content of the data may not need to be determined. In some embodiments, a timestamp for a pulse of a particular piece of data can be used to track a difference between transmission and reception. Content (e.g., decrypted content) can be used to match pulses so that the correct differences in times can be computed. In some implementations, the encrypted information can include an indicator that authenticates which stage the message corresponds, e.g., ranging requests 201 can correspond to stage 1 and ranging responses 202 can correspond to stage 2. Such use of an indicator may be helpful when more than two devices are performing ranging operations in near each other.

The narrow pulses (e.g., ~ one nanosecond width) can be used to accurately determine a distance. The high bandwidth (e.g., 500 MHz of spectrum) allows the narrow pulse and accurate location determination. A cross correlation of the pulses can provide a timing accuracy that is a small fraction of the width of a pulse, e.g., providing accuracy within hundreds or tens of picoseconds, which provides a sub-meter level of ranging accuracy. The pulses can represent a ranging wave form of plus 1's and minus 1's in some pattern that is recognized by a receiver. The distance measurement can use a round trip time measurement, also referred to as a time-of-flight measurement. As described above, the access device or mobile device can send a set of timestamps, which can remove a necessity of clock synchronization between the two devices.

II. Many to Many Scenario

For certain applications, multiple access devices may conduct ranging with multiple mobile devices. Techniques can be implemented to overcome the challenges due to mobile device or access device clock drift. These techniques can minimize the overlapping communications that can occur due to clock drift or other synchronization issues.

Figure 3:
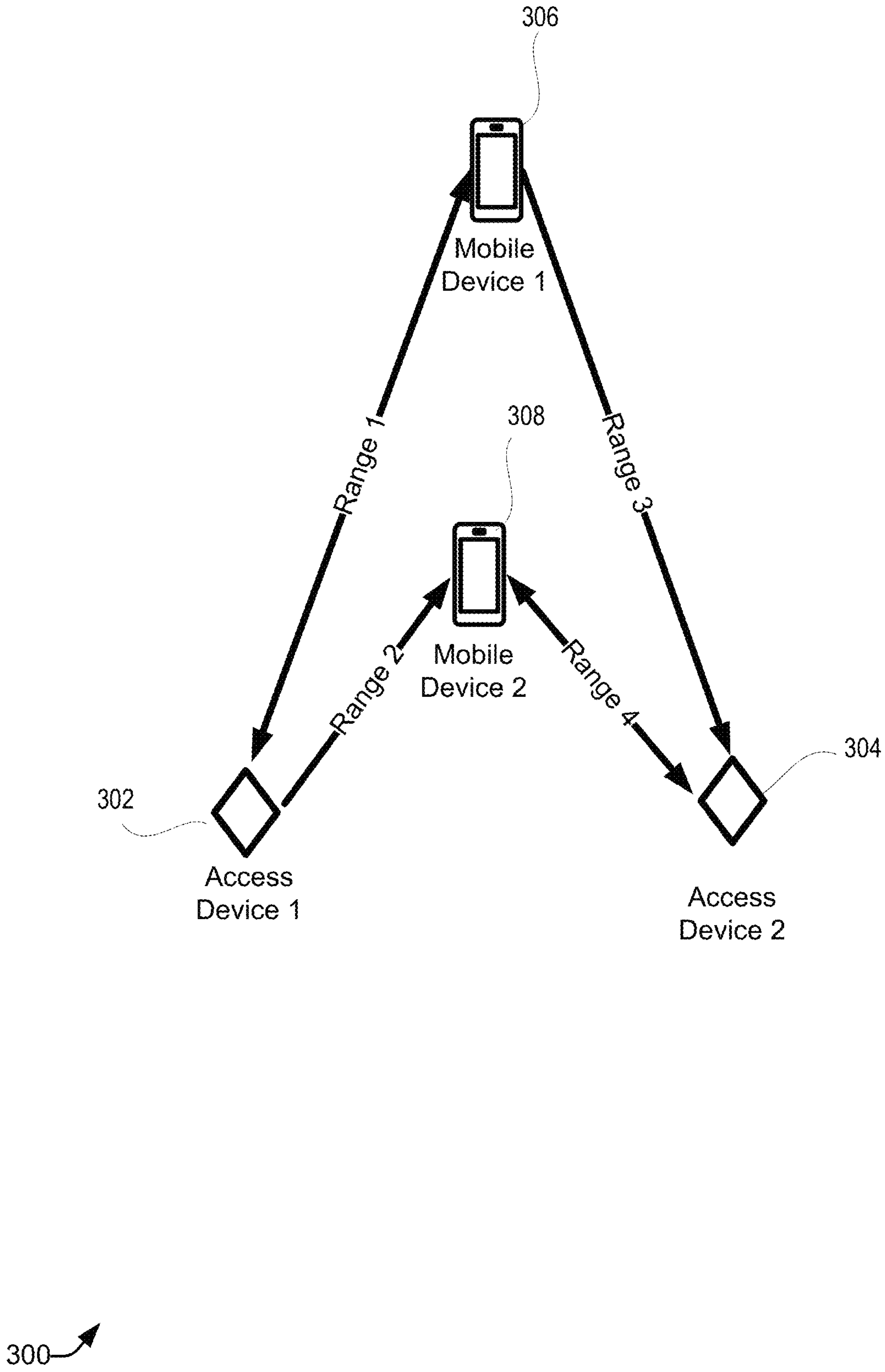
FIG. 3 illustrates schematically an example of many-to-many ranging scenario involving multiple devices.

FIG. 3 illustrates a many-to-many communication group involving two access devices (access device 302 and access device 304) and two mobile devices (mobile device 306 and mobile device 308). Although four devices are depicted in FIG. 3, these techniques can occur with many devices. FIG. 3 is an exemplary depiction of many-to-many ranging that may be improved upon.

Many-to-many ranging can present challenges. For instance, signal collision, or co-channel interference, can be caused by multiple devices simultaneously transmitting on the same frequency at the same time. The overlap between the simultaneous signals can cause interference that makes the signals unintelligible. Interference can be caused by transmissions on separate frequency bands called adjacent-channel interference or crosstalk. A signal can emit power into adjacent channels (e.g., frequency bands) if the signals are inadequately filtered. In addition, multipath propagation, or the signals reaching an antenna by different paths, can cause signal interference.

Various embodiments can solve such problems using a published schedule for when certain messages are sent (e.g., phases, timeslots, mini-slots, etc.). Additionally, scheduling a discovery process (phase) can determine how to assign timeslots. Information about assignments can be provided from an access device to a mobile device.

Any of access devices 302 and 304 can be designated as the coordinator for a ranging session with one of mobile device 306 or 308. A particular access device can provide an assignment message (e.g., including an assigned timeslot) to a particular mobile device, and thus the particular access device can be considered a coordinator for the ranging session with the particular mobile device. For instance, access device 302 can be the coordinator for mobile device 306 and access device 304 can be the coordinator for mobile device 308. The coordinator may be the access device whose mini-slot the mobile device selects, e.g., based on signal strength or other criterion. In some instances, the coordinator may assign a mini-slot to the mobile device based on signal strength or other criterion.

As examples, the access device can be an entry gate at a transit station or an entrance to a corporate campus where badged employees can gain entry to an access-controlled area. The mobile device can be a smartphone, a tablet, or other mobile electronic device. The mobile devices can be from any number of different manufacturers, types, or models of devices. Each mobile device can include a unique identification number. In some embodiments, the unique identification number can be a universally unique identifier (UUID). A UUID can be a 128-bit number used to identify a computing device such as an access device or a mobile device. The UUID can be randomly generated and individually assigned to the mobile device hardware by the manufacturer.

III. Access Control in a Congested Environment

Access control to a restricted area can be implemented, in part, by locating a mobile device. However, access control in a congested environment can present technical challenges. Message collisions, body attenuation, or pathfinding errors can mean that ranging is inaccurate, or at times, cannot be achieved. To perform access control in a congested environment, a contention-based discovery process can be used to establish a secure connection between a mobile device and one or more access devices. Ranging performed via the secure channel can be used to locate the mobile device, and an access decision can be determined when the device reaches an entryway to the restricted area or if the mobile device is within a threshold distance of the access device.

Figure 4:
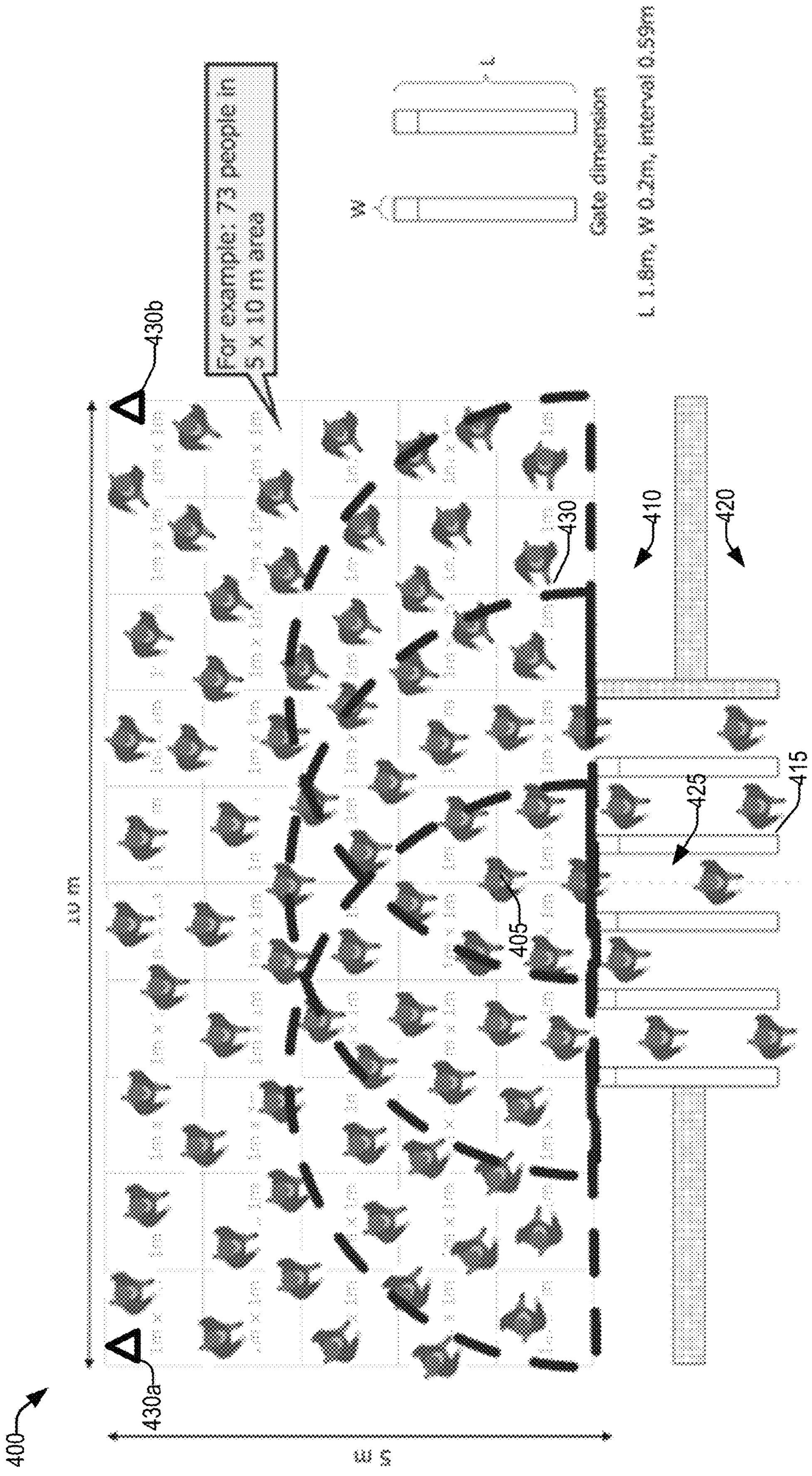
FIG. 4 shows a simplified diagram of access control in a congested environment according to an embodiment.

FIG. 4 shows a simplified diagram of access control in a congested environment 400 according to an embodiment. Congested environment 400 can be any environment where access control is performed for a large volume of people. For instance, crowded environment 400 can be a theme park, corporate campus, university campus, government facility, sports arena, music venue, hospital, public transit entrance, etc.

In this example, congested environment 400 is a ten meter by five-meter space with people (e.g., person 405) separated by approximately one meter. Congested environment 400 can be part of an unrestricted area 410 and gates 415 can perform access control to limit admission to a restricted area 420. Gates, such as gate 415, can comprise one or more authentication devices and one or more access control devices. For instance, an access control device can include an arm, barrier, or alarm to control access to restricted area 420 (e.g., an alarm can sound if an unauthorized person enters entryway 425).

A mobile device possessed by person 405 can communicate with an authentication device in gate 415 if he is within range of the gate (e.g., within semicircle 430). Before the mobile device is within range, the mobile device may communicate with beacon devices 435*a-b* (e.g., transmission devices) broadcasting ultra-wideband (UWB) messages and possibly Bluetooth messages. The mobile device may be able to receive timing information (also referred to as scheduling information) and calculate an approximate location (e.g., via downlink time difference of arrival (TDoA)) using the broadcast messages. The mobile device may receive a schedule of sessions, phases, timeslots, and/or mini-slots from the beacon devices. The mini-slots or timeslots may be associated with an authentication device identifier such as a universally unique identifier (UUID).

Within range (e.g., within semicircle 430), the mobile device can perform contention-based discovery to establish communication with one or more access devices. Once communication is established, the mobile device, and person 405, can be located using secure ranging. If the person 405 is located within entryway 425, the mobile device can provide an access credential to gate 415, and the gate can grant access based on the access credential.

A. Contention-Based Discovery

For some applications, a contention-based discovery protocol can allow multiple mobile devices or access devices in a congested environment to communicate over a radio channel without pre-coordination. The protocol can comprise rules that define how and when an access device can transmit or receive packets so that multiple access devices are given a reasonable opportunity to operate. The contention-based discovery protocol can define a polling phase, a response phase, and a final phase.

1. Polling Phase

The polling phase in contention-based discovery notifies the mobile device that the device is in range of an access device. Messages sent by the access device, during the polling phase, may contain timing information that defines how and when the mobile device can respond to the access device.

Figure 5:
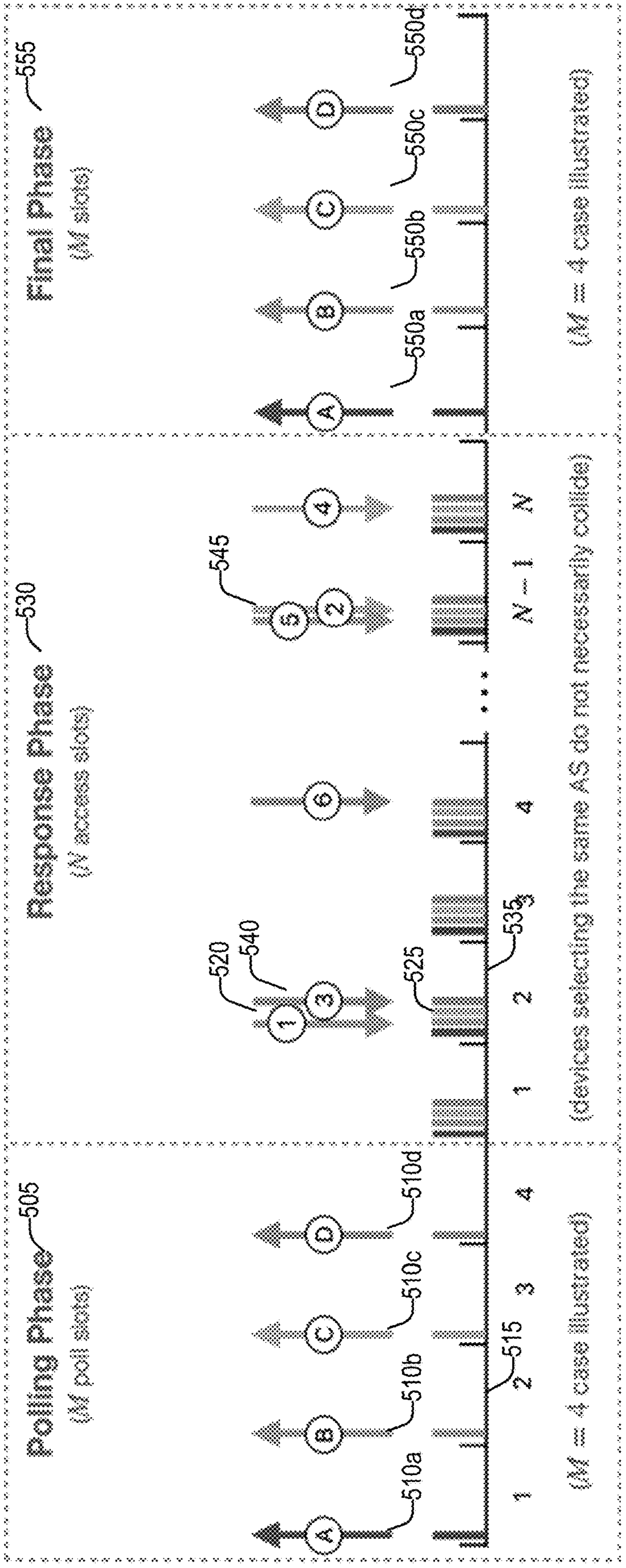
FIG. 5 is a simplified diagram showing contention-based discovery according to an embodiment.

FIG. 5 is a simplified diagram 500 showing contention-based discovery according to an embodiment. In the polling phase 505, access devices can broadcast polling messages 510*a-d*. Each access device can broadcast a message (e.g., polling message 510*b*) during regular interval called a timeslot 515. A polling message can be an ultra-wideband radio transmission, and each polling message can contain a universally unique identifier (UUID) identifying the access device. Each access device can be assigned a particular timeslot, e.g., as shown.

The polling messages can be received by a mobile device. Polling messages 510*a-d* can contain timing information comprising a broadcast time and/or scheduling information. The polling message can include the public key of the access device. The broadcast time for an individual polling message can be the time that the access device broadcast that message. The mobile device may use the broadcast messages to calculate an approximate distance between the mobile device and access device using the downlink TDoA technique (e.g., by determining a difference between a reception time to the broadcast time). Clock synchronization can occur via a beacon device, which provides a timing signal (synchronized with the access devices) to which an offset can be determined relative to the mobile device's clock. In some implementations, the mobile device can acquire the timing of the infrastructure (i.e., the beacons and access devices) by receiving one or more of the beacon transmissions. This time synchronization, along with scheduling information, may allow the mobile device to know when the device should listen for poll messages from one or more access devices. In some implementations, the mobile device may assume the broadcast time based on scheduling information received from a beacon device. Thus, an approximate distance could be determined without the need for a polling message to include a broadcast time.

The scheduling information can be a schedule of timeslots, or mini-slots, that indicate when access devices will be listening for response messages. In other examples, the scheduling information may be received from beacon devices or downloaded from the internet prior to contention-based discovery. The scheduling information may allow the mobile device to respond to a particular access device during the response phase described below. The approximate distance, or other characteristics of the polling message (e.g., received message strength indicator (RSSI)), can be used to determine which access device to respond to. For example, the mobile device may use approximate distance or RSSI to identify, and respond to, the closest access device.

However, there could be other methods the mobile device could use to determine which access device it should respond to. Also, the selected access device may not necessarily be the one that is the nearest to the mobile device. For example, the mobile device could be placed in a handbag, in which case, it could be pointed away from the nearest access device and a different access device may be selected. Additionally, signal interference, such as interference caused by body attenuation can cause the mobile device to select an access device that is not the closest.

2. Response Phase

During the response phase, a mobile device may select and respond to an access device during a randomly selected timeslot. Each timeslot can be subdivided into regular intervals, or portions of the timeslot, called mini-slots, and each mini-slot can be allocated to a particular access device. The mobile device, during a randomly selected timeslot, can respond to a particular access device by transmitting a response message during a particular access device's mini-slot. While selecting the timeslot may be random, logic may dictate mini-slot selection.

Returning to FIG. 5, a response message can be sent during a selected timeslot, and potentially during a mini-slot corresponding to the access device determined during the polling phase. For instance, the mobile device may decide to send a response message 520 during a mini-slot 525 corresponding to the access device that transmit polling message 501*b*. To avoid collisions, the response phase 530 can be divided into one or more timeslots 535. The mobile device can randomly select and transmit a response phase during a timeslot. In some circumstances, the mobile device may include timing information, such as transmission time for the response message, a reply time, or a public-key for the mobile device in the response message.

The random selection of a timeslot, and the division of timeslots into mini-slots, can reduce the number of collisions in a crowded environment. For instance, without mini-slots, response message 520 and response message 540 would have collided. Similarly, without the random timeslot selection, response message 520 and response message 545 may have collided.

Mini-slots can also allow for shorter ranging blocks when compared to complete serialization. Complete serialization would correspond to performing all communications for each gate in serial.

Figure 6:
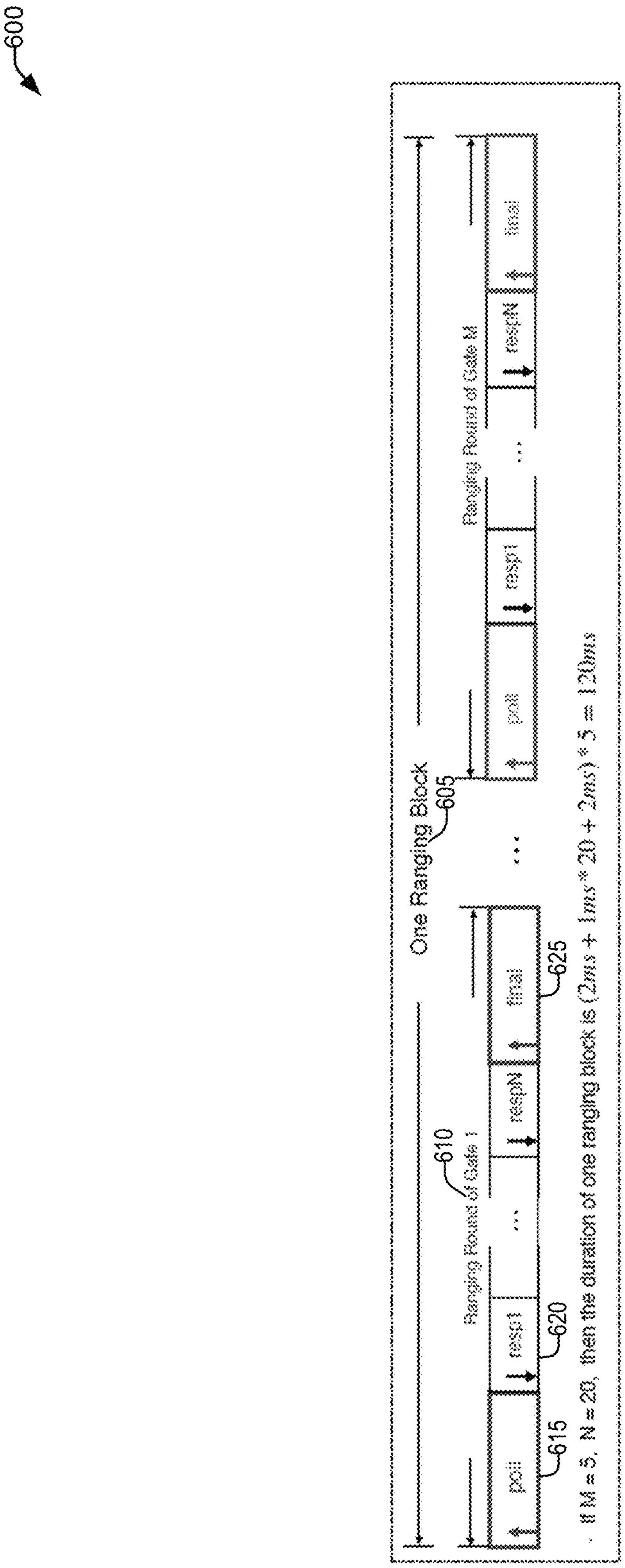
FIG. 6 shows a simplified diagram of a serialized ranging block according to an embodiment.

FIG. 6 shows a simplified diagram 600 of a serialized ranging block according to an embodiment. In complete serialization, each access device conducts ranging in sequential rounds during a serialized ranging block 605. Serialization can mean that a first access device conducts all three phases of contention-based discovery before a second access device begins the discovery process. A ranging round (e.g., ranging round 610) can include a polling phase 615, a response phase 620, and a final phase 625 for a single access device.

Figure 7:
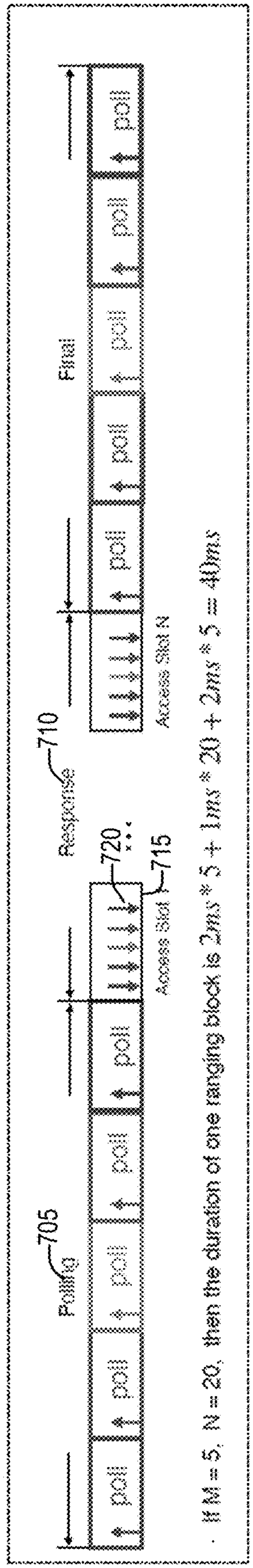
FIG. 7 shows a simplified diagram 700 of a ranging block with mini-slots according to an embodiment.

FIG. 7 shows a simplified diagram 700 of a ranging or discovery block (session) with mini-slots according to an embodiment. Mini-slots can allow for a condensed ranging block with mini-slots for each access device interleaved in a sequential order. During the polling phase 705, multiple access devices can send polling messages sequentially. In the response phase 710, an access timeslot 715 can be subdivided into one or more mini-slots (e.g., mini-slot 720). A mini-slot may be created for one or more of the access devices involved in polling phase 705. The mini-slots can mean that each access device may receive a message during access timeslot 715.

Mini-slots can significantly reduce the length of a ranging block. A ranging block with mini-slots can take one third of the time of a serialized ranging block 605. For example, access device processing time can be 1 milliseconds (ms) and mobile device processing time can take 2 ms. If there are five access devices and twenty timeslots, serialized ranging block 605 can last for 120 ms ([2 ms+1 ms*20+2 ms] *5=120 ms). In contrast, a ranging block with mini-slots can take 40 ms (2 ms*5+1 ms*20+2 ms*5=40 ms).

3. Third Phase

In the third phase, a timeslot assignment and potentially a secure connection is established between the mobile device and the access device. The access device can send an assignment message to a mobile device as an acknowledgement to the mobile device and to coordinate secure ranging.

Returning to FIG. 5, assignment messages 550*a-d* can be sent during the response phase 555. Assignment messages 550*a-d* can be an answer to a response message received during response phase 530. The mobile devices, in response phase 530, can select an access device to respond based on proximity (e.g., calculated distance, RSSI). However, an access device may be the closest device to more than one mobile device. For instance, response message 520 and response message 545 were sent by mobile devices that were closest to the same access device. In this situation, the access device, or multiple access devices working in concert, can select between mobile devices based on proximity. However, other selection criteria are contemplated. Accordingly, one or more access device can use timing information in a response message, or the response's message strength, to select a mobile device (e.g., via RSSI or TDoA).

The assignment message can include scheduling information for secure ranging. The scheduling information can comprise the number and length of timeslots for secure ranging, and which response-slot the mobile device should use during secure ranging. A mobile device may be assigned more than one response-slot under some circumstances. The assignment message can also include the public-key and additional authentication information for one or more access devices. The assignment messages may include one or more device identifiers, and the selected mobile device may be assigned one or more dedicated slots in the secure ranging portion of the exchange. The assignment message may include a list of addresses and assignment slots for one or more mobile devices. If assignment message is too long, it may be fragmented and sent in multiple assignment slots. If there are not enough assignment slots in the third phase, the access device can decide to split assignment message and send during the next round of contention-based discovery. The timing information for the secure ranging schedule can also be obtained before or after contention-based discovery, and, for example, the timing schedule, including the length and number of timeslots or mini-slots, can be downloaded from beacon devices or a network such as the Internet.

B. Secure Ranging

A secure ranging protocol can allow a mobile device and access devices to exchange messages in a congested many-to-many environment. A response message transmitted by a mobile device can be received by multiple access devices, and the device can be located using a single, potentially protected, message. When the mobile device is sufficiently close to an access device, an access credential can be exchanged between the devices. Secure ranging can comprise a polling phase, a response phase, and a final phase.

1. Polling Phase

During the polling phase, access devices may transmit poll packets in sequential timeslots. The poll packet may be a broadcast signal that can be received by multiple mobile devices. For example, the access devices can transmit a polling messages that identify the transmitting access device and can possibly identify a response-slot, e.g., in addition or alternatively to sending in the assignment message in a discovery session. The polling message may be protected by the secure channels using the exchanged public-keys between the access devices and the mobile devices. For example, a group key could be derived to protect this broadcast signal.

Figure 8:
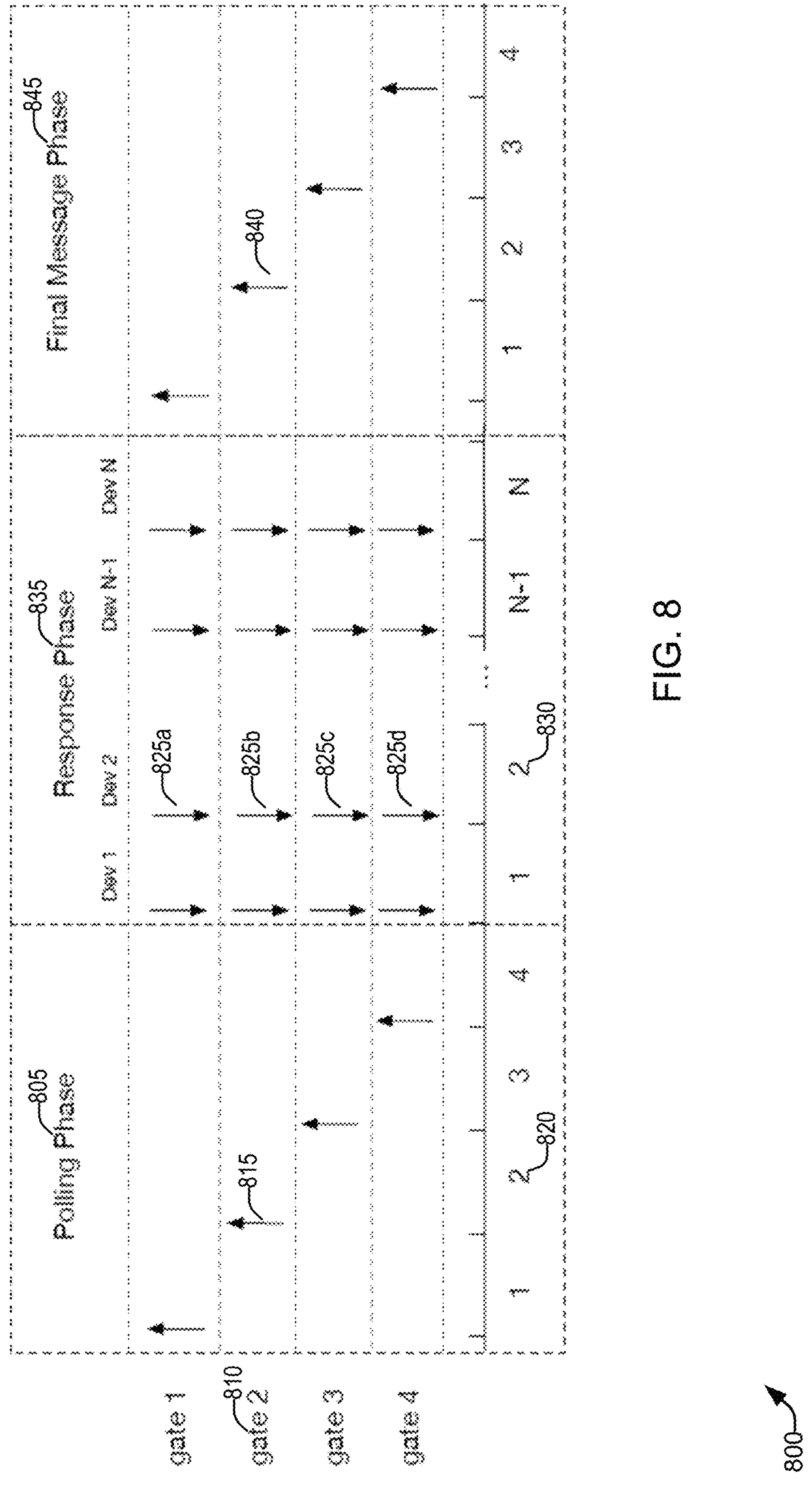
FIG. 8 is a simplified diagram showing secure ranging according to an embodiment.

FIG. 8 is a simplified diagram showing secure ranging 800 according to an embodiment. The polling phase 805 can allow the access devices (e.g., access device 810) to transmit with a reduced collision risk. For instance, access device 810 can transmit the polling message 815 during a timeslot 820. The mobile device may know to listen for the polling message during the timeslot 820 (e.g., based on an assignment to access device 810), and the timeslot 820 may have been provided to the mobile device via an assignment message as discussed in section III.A.3. In some circumstances, multiple timeslots can be assigned to a mobile device. The polling message can identify the access device by using a device identifier such as a universally unique identifier (UUID) etc.

2. Response Phase

Ranging between the mobile device and one or more access devices can occur in the response phase. The mobile device can transmit a single response message, e.g., with timing information to determine distance, that can be received by one or more access devices. The mobile device's location may be triangulated with a single response message because the message can be received by multiple access devices.

Returning to FIG. 8, the mobile device that received polling message 815 can transmit one or more response messages 825*a-d* during a designated response-slot 830. In some instances, the response message 825*a-d* can be a single response message that is received by multiple access devices. A mobile device may be assigned more than one response-slot 830 in some instances, e.g., if ranging with more than one access device. As shown, the mobile device performs ranging with all four access devices by transmitting a single response message that can be received by each access device, but ranging can be performed fewer or more access devices. The timeslot may have been designated in the polling message from section III.B.1 or the assignment message from section III.A.3. During the response phase 835, one or more assigned access devices can listen for response messages during each timeslot, e.g., as an access device can be assigned to range with a particular mobile device during a particular timeslot. Response messages 825*a-d* can include a reply time (e.g., the difference between the polling message reception time and the response message transmit time), and the access devices can calculate a distance between the access devices and the mobile device (e.g., via TDoA, RSSI, etc.). The calculated distance, and the known locations of the access devices, can be used to triangulate a location for the mobile device.

In some implementations, separate replay times (or other timing information) for each access device can be included in a single response message, which can effectively be a combination of response messages 825*a-d*. Each piece of timing information can be labeled for a corresponding access device.

In another example, a mobile device can respond to more than one access device at different timeslots. If the mobile device was assigned multiple timeslots, the mobile device can listen for polling messages transmitted by multiple access devices in the polling phase described in section III.B.1. The mobile device can calculate reply times for each access device and include the reply times in response messages transmitted during two or more response-slots. Thus, the response messages to multiple access devices can be performed in various ways.

Figure 9:
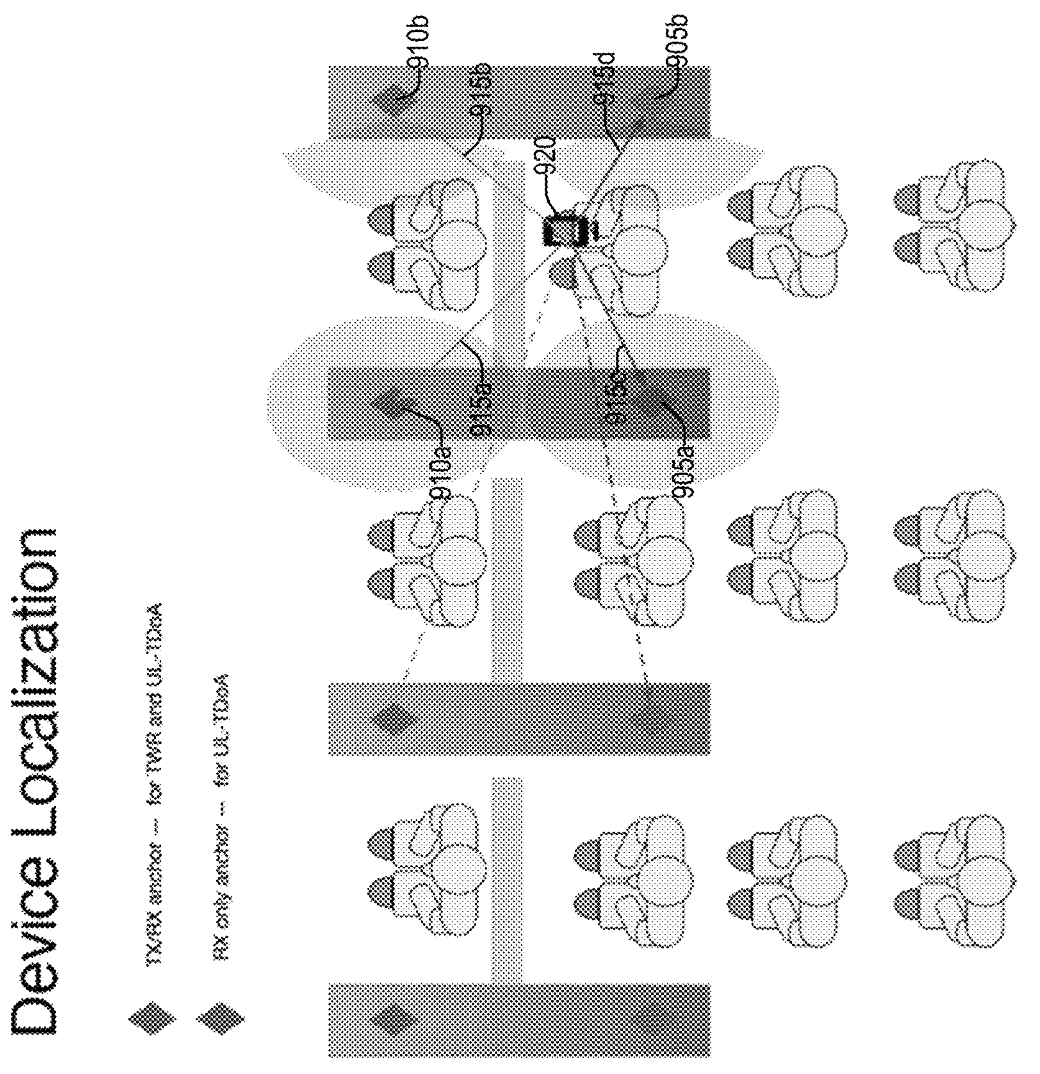
FIG. 9 shows a simplified diagram of device localization using secure ranging according to an embodiment.

FIG. 9 shows a simplified diagram of device localization using secure ranging according to an embodiment. Various techniques can be used for device localization including downlink time difference of arrival (DL-TDoA), multiple two way ranging (TWR), uplink time difference of arrival (UL-TDoA), etc. Access devices, including transmit/receive (TX/RX) access devices 905*a-b* and receive (RX) access devices 910*a-b* (also referred to as passive devices or a passive receiver), can listen for response messages 915*a-d* from mobile device 920. Response messages 915*a-d* can include a reply time comprising a reception time for the polling message from section III.B.1 and a transmit time for the response message. Each access device, including TX/RX access devices 905*a-b* and RX access devices 910*a-b*, can calculate a linear distance between the access device and mobile device 920. The distances can be triangulated to locate the mobile device at a particular location.

3. Final Phase

During the final phase, the access device can receive an access message from an access device. The access message can provide a location to the mobile device, or timing information so the mobile device can calculate its location, or authentication and scheduling information for the access credential exchange. If the mobile device is sufficiently close to the access device, or located in an entryway to a restricted area, the mobile device can provide an access credential to an access device. The access credential can be used, by the access device, to determine whether access to the restricted area should be granted to the mobile device.

Returning to FIG. 8, an access message 840 can be sent during the final phase 845 (e.g., a third phase). Access message 840 can provide information, such as one or more of a location for the mobile device (e.g., a distance between the mobile device and a closest access device), a trigger message, the timing information related to a reply time from the access device (or other time) for the mobile device to determine a range, and/or scheduling information for a future round of secure ranging or a future round of data transfer such that the mobile device can provide the access credential to the access device. The mobile device may use the timing information to calculate mobile device's location. If the mobile device is within a threshold distance of an access device, or an entry way, an access credential can be provided to an access device. The trigger message can cause the mobile device to provide the access credential. The threshold distance can be 0.01 meters (m), 0.1 m, 1 m, 1.5 m, 2 m, 3 m, 4 m, 5 m, 10 m, 100 m, etc. If the mobile device is outside of the threshold distance, access message may contain scheduling information such as an assigned timeslot or response-slot.

IV. Exemplary Access Control Walkthrough

In an illustrative example, a person is attempting to gain access to a restricted area. In this case, the restricted area is a public transit terminal and the person is attempting to access a subway system.

Figure 10:
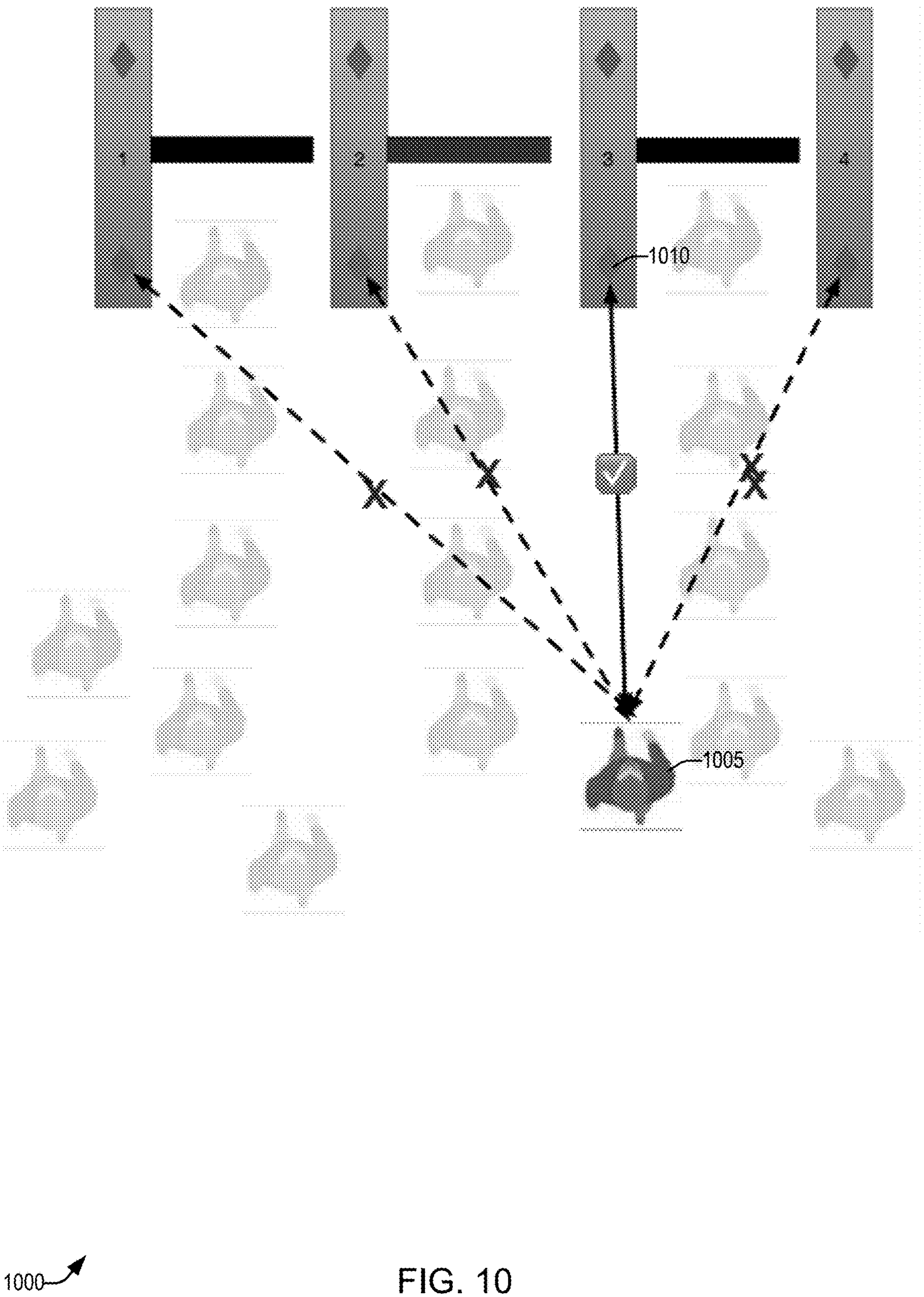
FIG. 10 shows a simplified diagram of a mobile device being discovered by an access device according to an embodiment.

FIG. 10 shows a simplified diagram 1000 of a mobile device being discovered by an access device according to an embodiment. The mobile device, possessed by the person 1005, is discovered by access device 1010 using contention-based ranging as described in section III.A.

Figure 11:
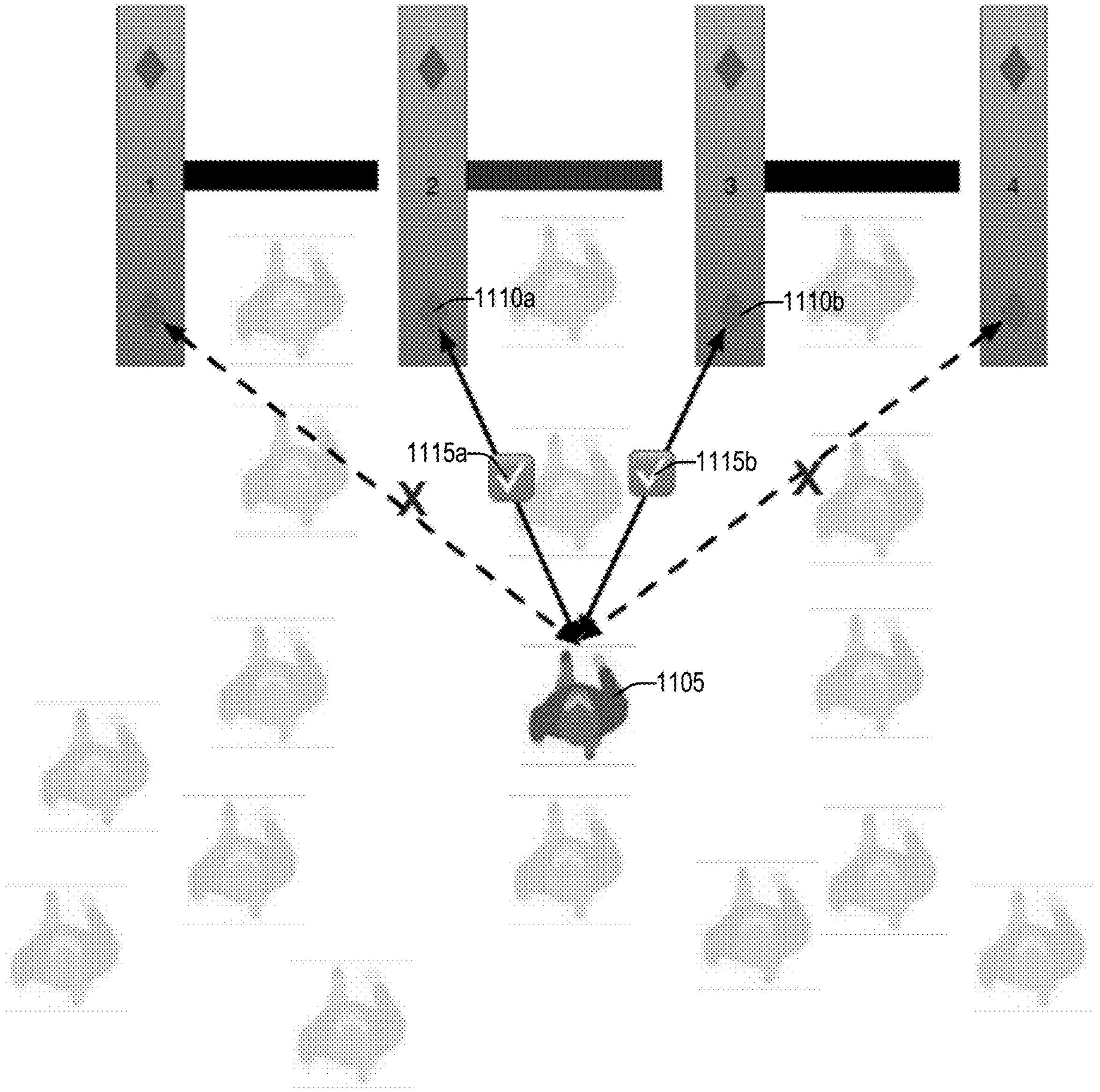
FIG. 11 shows a simplified diagram of a mobile device securely ranging with access devices according to an embodiment.

Continuing the example, the mobile device securely ranges with access devices after the mobile device is discovered. FIG. 11 shows a simplified diagram 1100 of a mobile device securely ranging with access devices according to an embodiment. During the secure ranging, the mobile device, possessed by person 1105, securely ranges with access devices 1110*a-b*. In this case, the mobile device was assigned more than one response-slot, and the mobile device can securely range with two access devices 1110*a-b*. The secure ranging can occur as described in section III.B. Messages 1115*a-b* exchanged between the mobile device and access devices 1110*a-b* can be used to locate the mobile device and person 1105. The messages can include polling messages, response messages, and access messages.

Figure 12:
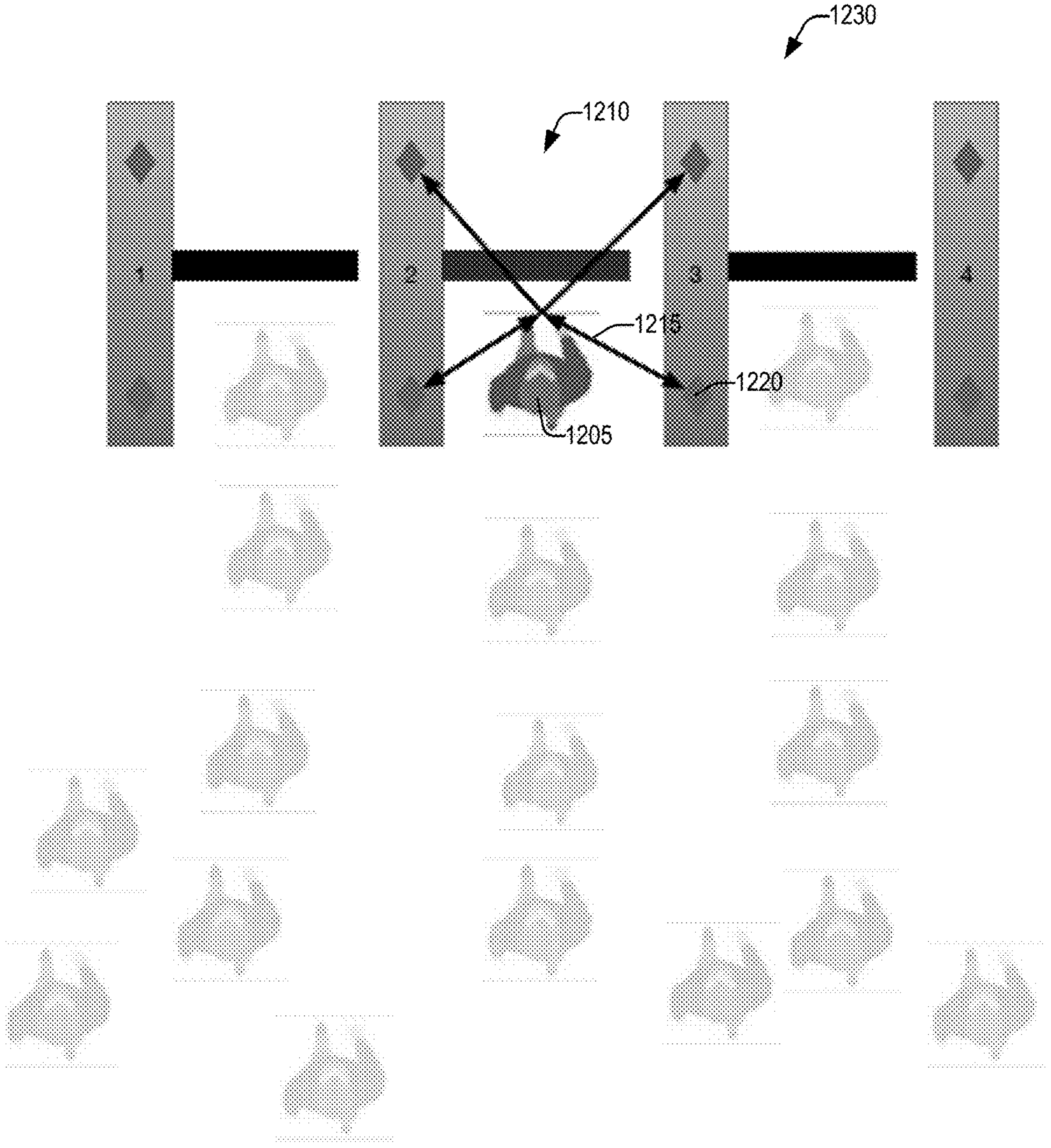
FIG. 12 is a simplified diagram of secure ranging for a mobile device in an entryway according to an embodiment.

Secure ranging can continue until the mobile device is located in an entryway to the restricted area. FIG. 12 is a simplified diagram 1200 of secure ranging for a mobile device in an entryway according to an embodiment. Secure ranging between the access devices can be used to locate the mobile device, and person 1205, within an entryway 1210. Once the mobile device is located in entryway 1210, an access credential can be provided, via message 1215 to an access device 1220. The access credential can be provided via a wireless message (e.g., UWB, Wi-Fi, Bluetooth, etc.). An access control device 1225, in this case a mechanical arm, can permit access to the restricted area 1230.

V. Methods for Performing Many-Many Ranging

Figure 13:
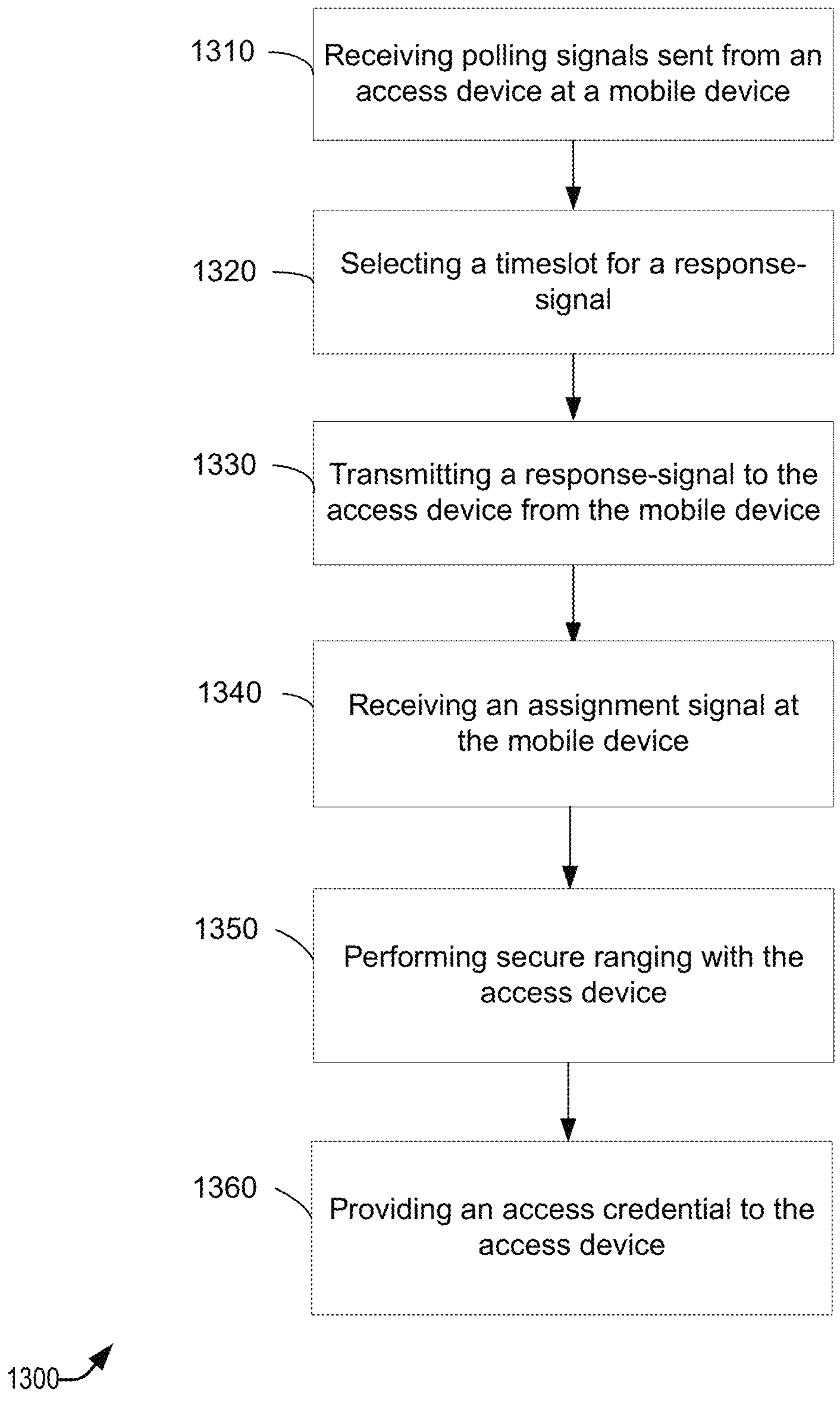
FIG. 13 is a flowchart illustrating a method for performing contention-based ranging with a mobile device.

Localization of a mobile device at access device can require using many-many ranging strategies because of the number of devices involved. Contention-based discovery can permit a mobile device to establish a secure connection with a mobile device, and secure ranging can be used to localize the mobile device. Many-to-many ranging can be performed using contention-based discovery, secure ranging, or a combination of both methods A. Contention-Based Discovery Flowchart FIG. 13 is a flowchart illustrating a method 1300 for performing contention-based ranging with a mobile device. In some implementations, one or more method blocks of FIG. 13 may be performed by a mobile device (e.g., mobile device 120, mobile device 220, mobile device 306, mobile device 308, mobile device 1500, mobile device 1600). In some implementations, one or more method blocks of FIG. 13 may be performed by another device or a group of devices separate from or including the mobile device. Additionally, or alternatively, one or more method blocks of FIG. 13 may be performed by one or more components of mobile device (e.g., mobile device 120, mobile device 220, mobile device 306, mobile device 308, mobile device 1500, mobile device 1600), such as always-on processor (AOP) 1530, application processor 1540, processor 1618, computer readable medium 1602, input/output (I/O) subsystem 1606, ultra-wideband (UWB) circuitry 1515, BT/WiFi circuitry 1525, wireless circuitry 1608, etc.

At block 1310, polling messages can be received. Each polling message (e.g., polling messages 510*a-d*) can include an identifier of a particular access device. The unique identifier can be a universally unique identifier (UUID).

Each polling message of the plurality of polling messages can be transmitted during a polling phase. The polling message can be transmitted by an access device (e.g., access device 110, access device 210, access device 302, access device 304). The polling message can be received during the polling phase (e.g., polling phase 505, polling phase 705).

At block 1320, the mobile device may select a timeslot. The selected timeslot may be a timeslot (e.g., timeslot 535, timeslot 715) in a response phase comprising one or more mini-slots (e.g., portions of a timeslot), and, in some circumstances, the selected timeslot may be a mini-slot (e.g., mini-slot 525, mini-slot 720). The mobile device may select a mini-slot based on proximity between the mobile device and the access device. The selected mobile device may be chosen using time of arrival or a received message strength (RSS) for the one or more polling messages from block 1310. Thus, the timeslot may comprises a plurality of portions, where each portion of the timeslot corresponds to a respective access device of the plurality of access devices.

At block 1330, the mobile device may transmit a response message. The mobile device may transmit a response message (e.g., response message 520, response message 540, response message 545) during the timeslot of the response phase (e.g., response phase 530, response phase 710). The timeslot may be the selected timeslot from block 1320. The response message may include a device public-key for the mobile device. The response message may be transmitted during a mini-slot, and the mini-slot may be associated with a particular access device.

At block 1340, an assignment message can be received by the mobile device. The assignment message can be sent during a third phase (e.g., final phase). The assignment message can include an assigned timeslot, or other timing information, for a response phase of a future session. The assignment message may include a public-key for the access device. The assignment message may include an instruction for the mobile device to perform secure ranging with a particular access device called an assigned access device. The instruction may include a unique identifier identifying the assigned access device.

At block 1350, the mobile device may perform secure ranging. The secure ranging can be performed between the mobile device and one or more access devices. The secure ranging can comprise the exchange of ranging messages between the mobile device and the one or more access devices. The mobile device may perform secure ranging during a future session using the assigned timeslot from block 1340. The secure ranging may be performed according to the method disclosed in section III or FIG. 14.

Circuitry of the one or more access devices, or the mobile device, can perform various levels of processing of ranging messages, e.g., to determine time stamps. The mobile device can receive the ranging response messages (e.g., ranging response 102) and determine time stamps for the transmission of the one or more ranging request messages (e.g., ranging request 101) and time stamps for the one or more ranging response messages, e.g., as shown in FIGS. 1 and 2. The mobile device, or one or more access devices, can use the times to determine a distance between the mobile device and one or more access devices. The ranging can be performed once, a specified number of times, or continue until a stop ranging request is processed.

At block 1360 the mobile device may provide an access credential to an access device. The mobile device may provide the credential based on a location determined using the secure ranging. For example, the mobile device may provide an access credential to an access device if the mobile device is found, via secure ranging, to be within a threshold distance of an access device, or entryway. The access credential may be provided in response to a trigger message received in the secure ranging.

Method 1300 may include additional implementations, such as any single implementation or any combination of implementations described below and/or in connection with one or more other processes described elsewhere herein.

Although FIG. 13 shows example blocks of method 1300, in some implementations, method 1300 may include additional blocks, fewer blocks, different blocks, or differently arranged blocks than those depicted in FIG. 13. Additionally, or alternatively, two or more of the blocks of method 1300 may be performed in parallel.

B. Secure Ranging Flowchart

Figure 14:
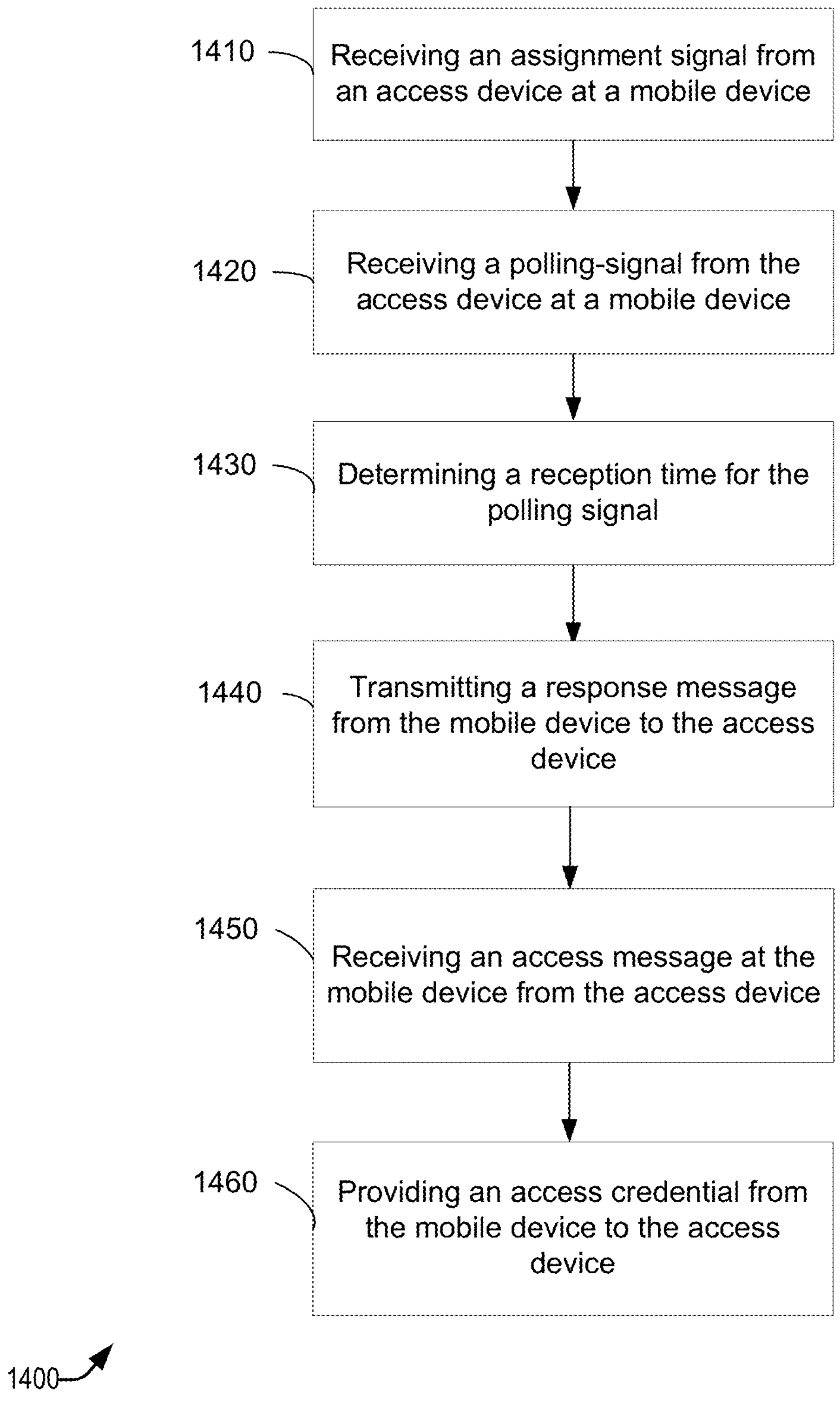
FIG. 14 is a flowchart illustrating a method for performing secure ranging with a mobile device.

FIG. 14 is a flowchart illustrating a method 1400 for performing secure ranging with a mobile device. In some implementations, one or more method blocks of FIG. 14 may be performed by a mobile device (e.g., mobile device 120, mobile device 220, mobile device 306, mobile device 308, mobile device 1500, mobile device 1600). In some implementations, one or more method blocks of FIG. 14 may be performed by another device or a group of devices separate from or including the mobile device. Additionally, or alternatively, one or more method blocks of FIG. 14 may be performed by one or more components of mobile device (e.g., mobile device 120, mobile device 220, mobile device 306, mobile device 308, mobile device 1500, mobile device 1600), such as always-on processor (AOP) 1530, application processor 1540, processor 1618, computer readable medium 1602, input/output (I/O) subsystem 1606, ultra-wideband (UWB) circuitry 1515, BT/WiFi circuitry 1525, wireless circuitry 1608, etc.

At block 1410, a mobile device may receive assignment messages from one or more access devices. The received assignment messages may identify an assigned response-slot (e.g., response-slot 830) of a response phase (e.g., response phase 835) of a future ranging session. The received assignment message can be transmitted by an access device (e.g., access device 110, access device 210, access device 302, access device 304). The assignment message can be the assignment message received at block 1340. The assignment message may be received from a beacon device (e.g., beacon devices 435*a-b*).

At block 1420, the mobile device may receive a polling message (e.g., ranging request message, ranging request 101, polling message 815) from one or more access devices. A polling message can include access device identification information such as a universal unique identifier (UUID). The polling message can be transmitted by an access device (e.g., access device 110, access device 210, access device 302, access device 304).

At block 1430, the mobile device may determine a reception time of the assignment message for one or more access devices. The reception time may be determined using a clock (e.g., sensors 1646), and, for instance, a clock state may be recorded when the assignment message is received at block 1410.

At block 1440, the mobile device may transmit a response message during the assigned response-slot. The response message (e.g., ranging response message, ranging response 102, response message 825*a-d*) can comprise a mobile device identifier (e.g., UUID) and timing information. As an example, the timing information can include reply time that can be a difference between the polling message reception time and the transmit time for the response message. As another example, the timing information can include a reception time and the transmit time individually. In either example, the timing information includes the reception time. The response message may be encrypted with an access device public-key. The response message may be transmitted to one or more passive devices (e.g., receive (RX) access devices 910*a*-*b*).

At block 1450, the mobile device may receive an access message 840 from a first access device (e.g., access device 810) of the plurality of access devices. The access message can include information indicating a distance between the mobile device and the first access device. The access message may be decrypted using a private-key of the mobile device. The information indicating a distance may include the distance as determined by the first access device. As another example, the access message can include the reception time (e.g., as part of a reply time) at one or more access devices for the response message from block 1440, and the mobile device can determine the distance between the mobile device and the access device. The access devices can be TX/RX access devices (e.g., TX/RX access devices 905*a*-*b*) or RX access devices (RX access devices 910*a*-*b*).

At block 1460, the mobile device may provide an access credential to the first access device. The access credential may be provided in response to the access message. For example, the access message can be a trigger message/command that indicates the mobile device can send the access credential, e.g., since the mobile device is sufficiently close. Besides a direct trigger, the access message can indicate the access credential should be sent by providing information indicating the distance, such that the mobile device can perform decision logic to determine exactly when to send the access credential, e.g., by comparing a determined or received distance to a threshold. As examples, information indicating the distance can be timing information, which can include one or more of: the transmit time, reception time, or reply time for any one or more of the polling messages, the assignment message, the response message, or the assignment message. Information indicating the distance can include the received signal strength for the polling message, assignment message, response message, or assignment message. The access credential can be provided in response to a trigger message received via an access message. The access credential may be provided to one or more passive devices (e.g., receive (RX) access devices 910*a*-*b*).

Circuitry of the one or more access devices, or the mobile device, can perform various levels of processing of ranging messages, e.g., to determine time stamps. The mobile device can receive the ranging response messages (e.g., ranging response 102) and determine time stamps for the transmission of the one or more ranging request messages (e.g., ranging request 101) and time stamps for the one or more ranging response messages, e.g., as shown in FIGS. 1 and 2. The mobile device, or one or more access devices, can use the times to determine a distance between the mobile device and one or more access devices. The ranging can be performed once, a specified number of times, or continue until a stop ranging request is processed.

Method 1400 may include additional implementations, such as any single implementation or any combination of implementations described below and/or in connection with one or more other processes described elsewhere herein.

Although FIG. 1400 shows example blocks of method 1400, in some implementations, method 1400 may include additional blocks, fewer blocks, different blocks, or differently arranged blocks than those depicted in FIG. 14. Additionally, or alternatively, two or more of the blocks of method 1400 may be performed in parallel.

VI. Mobile Device for Performing Ranging

Figure 15:
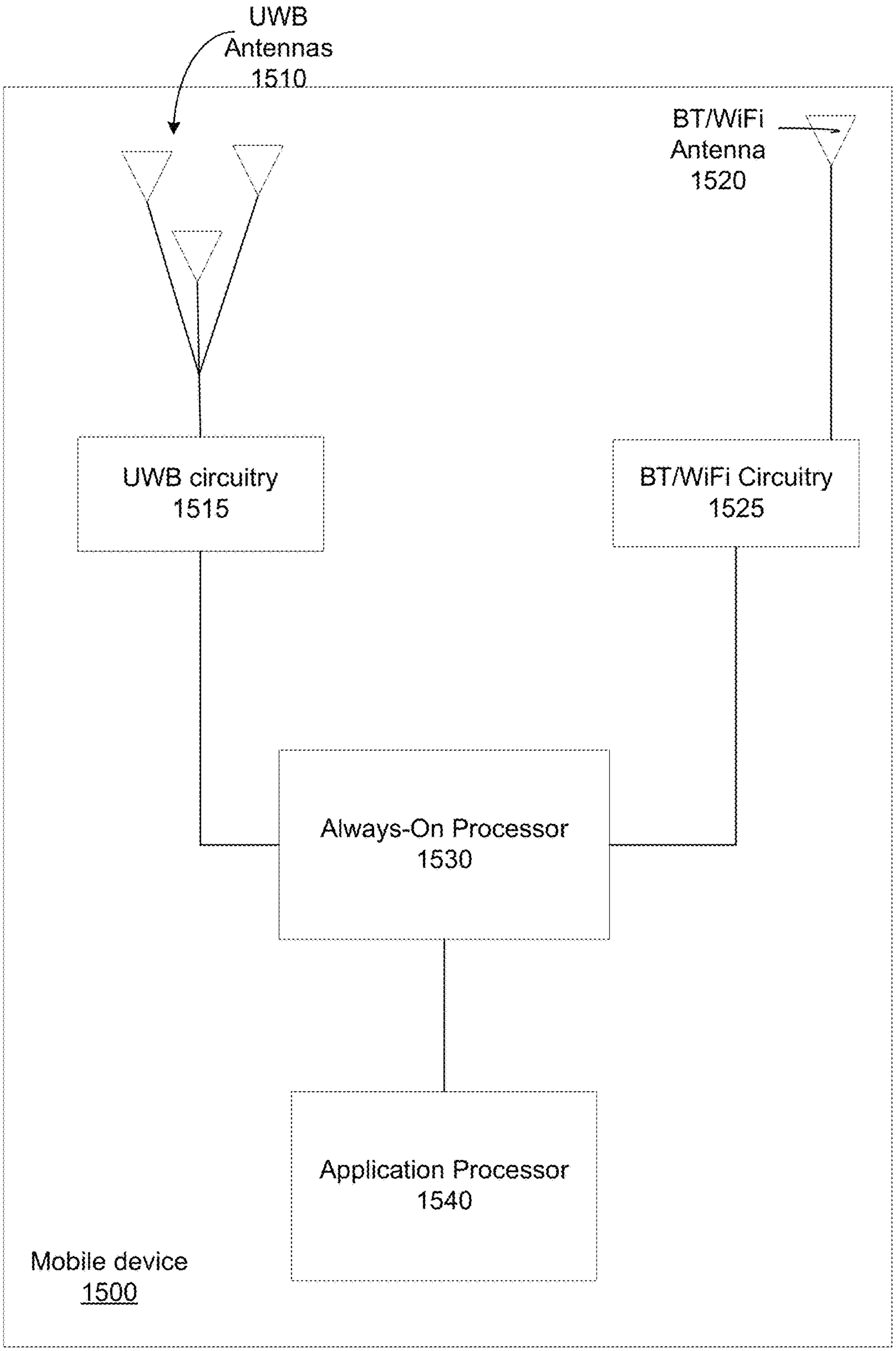
FIG. 15 is a block diagram of components of a mobile device operable to perform ranging according to embodiments of the present disclosure.

FIG. 15 is a block diagram of components of a mobile device 1500 operable to perform ranging according to embodiments of the present disclosure. Mobile device 1500 includes antennas for at least two different wireless protocols, as described above. The first wireless protocol (e.g., Bluetooth) may be used for authentication and exchanging ranging settings. The second wireless protocol (e.g., UWB) may be used for performing ranging with another mobile device.

As shown, mobile device 1500 includes UWB antennas 1510 for performing ranging. UWB antennas 1510 are connected to UWB circuitry 1515 for analyzing detected messages from UWB antennas 1510. In some embodiments, mobile device 1500 includes three or more UWB antennas, e.g., for performing triangulation. The different UWB antennas can have different orientations, e.g., two in one direction and a third in another direction. The orientations of the UWB antennas can define a field of view for ranging. As an example, the field of view can span 120 degrees. Such regulation can allow a determination of which direction a user is pointing a device relative to one or more other nearby devices. The field of view may include any one or more of pitch, yaw, or roll angles.

UWB circuitry 1515 can communicate with an always-on processor (AOP) 1530, which can perform further processing using information from UWB messages. For example, AOP 1530 can perform the ranging calculations using timing data provided by UWB circuitry 1515. AOP 1530 and other circuits of the device can include dedicated circuitry and/or configurable circuitry, e.g., via firmware or other software.

As shown, mobile device 1500 also includes Bluetooth (BT)/Wi-Fi antenna 1520 for communicating data with other devices. BT/Wi-Fi antenna 1520 is connected to BT/Wi-Fi circuitry 1525 for analyzing detected messages from BT/Wi-Fi antenna 1520. For example, BT/Wi-Fi circuitry 1525 can parse messages to obtain data (e.g., an authentication tag), which can be sent on to AOP 1530. In some embodiments, AOP 1530 can perform authentication using an authentication tag. Thus, AOP 1530 can store or retrieve a list of authentication tags for which to compare a received tag against, as part of an authentication process. In some implementations, such functionality could be achieved by BT/Wi-Fi circuitry 1525.

In other embodiments, UWB circuitry 1515 and BT/Wi-Fi circuitry 1525 can alternatively or in addition be connected to application processor 1540, which can perform similar functionality as AOP 1530. Application processor 1540 typically requires more power than AOP 1530, and thus power can be saved by AOP 1530 handling certain functionality, so that application processor 1540 can remain in a sleep state, e.g., an off state. As an example, application processor 1540 can be used for communicating audio or video using BT/Wi-Fi, while AOP 1530 can coordinate transmission of such content and communication between UWB circuitry 1515 and BT/Wi-Fi circuitry 1525. For instance, AOP 1530 can coordinate timing of UWB messages relative to BT advertisements.

To perform ranging, BT/Wi-Fi circuitry 1525 can analyze an advertisement message from another device to determine that the other device wants to perform ranging, e.g., as part of a process for sharing content. BT/Wi-Fi circuitry 1525 can communicate this notification to AOP 1530, which can schedule UWB circuitry 1515 to be ready to detect UWB messages from the other device.

For the device initiating ranging, its AOP can perform the ranging calculations. Further, the AOP can monitor changes in distance between the other devices. For example, AOP 1530 can compare the distance to a threshold value and provide an alert when the distance exceeds a threshold, or potentially provide a reminder when the two devices become sufficiently close. An example of the former might be when a parent wants to be alerted when a child (and presumably the child's device) is too far away. An example of the latter might be when a person wants to be reminded to bring up something when talking to a user of the other device. Such monitoring by the AOP can reduce power consumption by the application processor.

VII. Example Device

Figure 16:
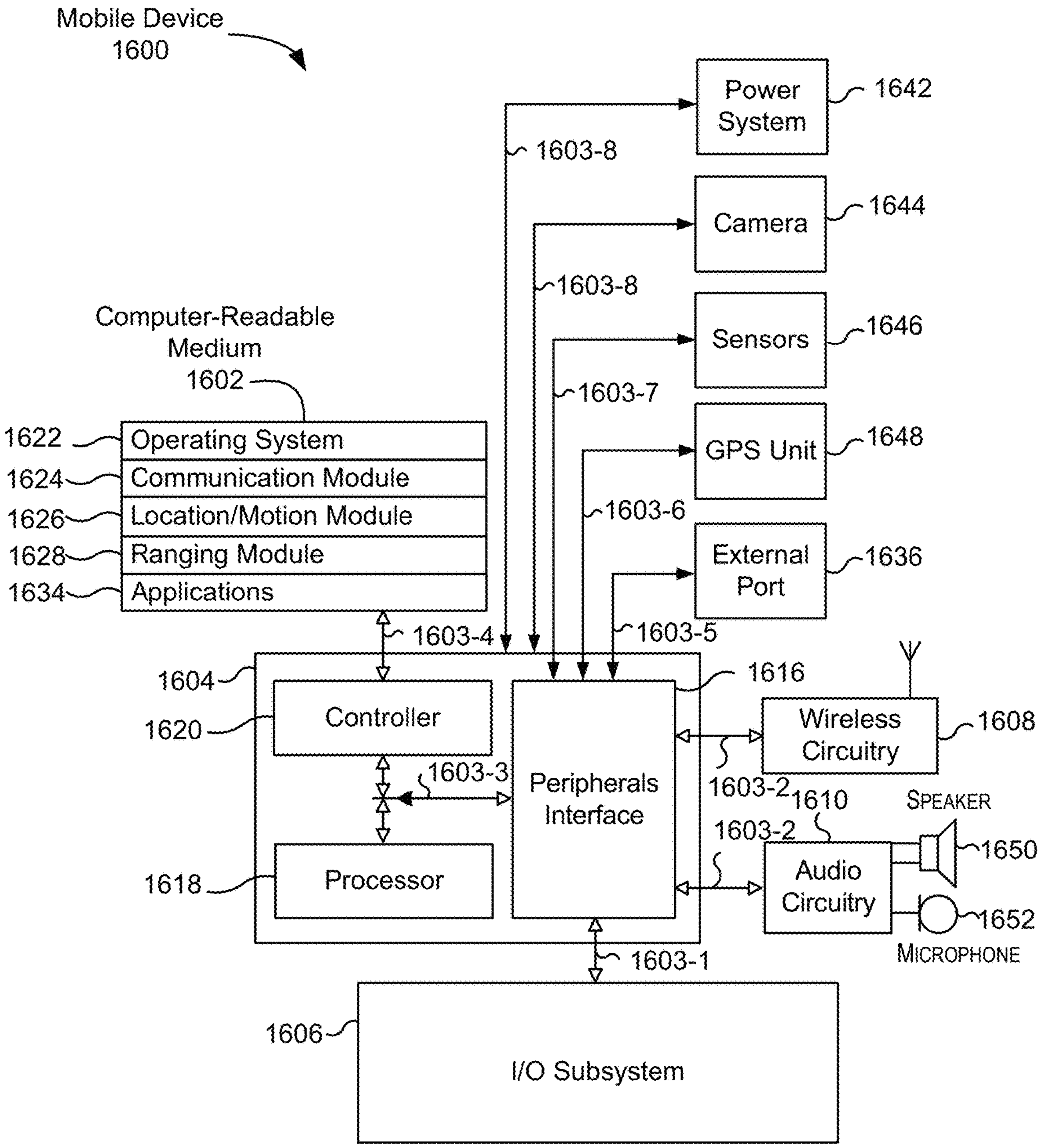
FIG. 16 is block diagram of an example device according to embodiments of the present disclosure.

FIG. 16 is a block diagram of an example electronic device 1600. Device 1600 generally includes computer-readable medium 1602, a processing system 1604, an Input/Output (I/O) subsystem 1606, wireless circuitry 1608, and audio circuitry 1610 including speaker 1612 and microphone 1614. These components may be coupled by one or more communication buses or signal lines 1603. Device 1600 can be any portable electronic device, including a handheld computer, a tablet computer, a mobile phone, laptop computer, tablet device, media player, personal digital assistant (PDA), a key fob, a car key, an access card, a multifunction device, a mobile phone, a portable gaming device, a headset, or the like, including a combination of two or more of these items.

it should be apparent that the architecture shown in FIG. 16 is only one example of an architecture for device 1600, and that device 1600 can have more or fewer components than shown, or a different configuration of components. The various components shown in FIG. 16 can be implemented in hardware, software, or a combination of both hardware and software, including one or more signal processing and/or application specific integrated circuits.

Wireless circuitry 1608 is used to send and receive information over a wireless link or network to one or more other devices' conventional circuitry such as an antenna system, a radio frequency (RF) transceiver, one or more amplifiers, a tuner, one or more oscillators, a digital signal processor, a coder-decoder (CODEC) chipset, memory, etc. Wireless circuitry 1608 can use various protocols, e.g., as described herein. In various embodiments, wireless circuitry 1608 is capable of establishing and maintaining communications with other devices using one or more communication protocols, including time division multiple access (TDMA), code division multiple access (CDMA), global system for mobile communications (GSM), Enhanced Data GSM Environment (EDGE), wideband code division multiple access (W-CDMA), Long Term Evolution (LTE), LTE-Advanced, Wi-Fi (such as Institute of Electrical and Electronics Engineers (IEEE) 802.11a, IEEE 802.11b, IEEE 802.11g and/or IEEE 802.11n), Bluetooth, Wi-MAX, Voice Over Internet Protocol (VoIP), near field communication protocol (NFC), a protocol for email, instant messaging, and/or a short message service (SMS), or any other suitable communication protocol, including communication protocols not yet developed as of the filing date of this document.

Wireless circuitry 1608 is coupled to processing system 1604 via peripherals interface 1616. Peripherals interface 1616 can include conventional components for establishing and maintaining communication between peripherals and processing system 1604. Voice and data information received by wireless circuitry 1608 (e.g., in speech recognition or voice command applications) is sent to one or more processors 1618 via peripherals interface 1616. One or more processors 1618 are configurable to process various data formats for one or more application programs 1634 stored on medium 1602.

Peripherals interface 1616 couple the input and output peripherals of device 1600 to the one or more processors 1618 and computer-readable medium 1602. One or more processors 1618 communicate with computer-readable medium 1602 via a controller 1620. Computer-readable medium 1602 can be any device or medium that can store code and/or data for use by one or more processors 1618. Computer-readable medium 1602 can include a memory hierarchy, including cache, main memory and secondary memory. The memory hierarchy can be implemented using any combination of random-access memory (RAM) (e.g., static random-access memory (SRAM) dynamic random access memory (DRAM), double data random access memory (DDRAM)), read only memory (ROM), FLASH, magnetic and/or optical storage devices, such as disk drives, magnetic tape, CDs (compact disks) and DVDs (digital video discs). In some embodiments, peripherals interface 1616, one or more processors 1618, and controller 1620 can be implemented on a single chip, such as processing system 1604. In some other embodiments, they can be implemented on separate chips.

Processor(s) 1618 can include hardware and/or software elements that perform one or more processing functions, such as mathematical operations, logical operations, data manipulation operations, data transfer operations, controlling the reception of user input, controlling output of information to users, or the like. Processor(s) 1618 can be embodied as one or more hardware processors, microprocessors, microcontrollers, field programmable gate arrays (FPGAs), application-specified integrated circuits (ASICs), or the like.

Device 1600 also includes a power system 1642 for powering the various hardware components. Power system 1642 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 1600 includes a camera 1644. In some embodiments, device 1600 includes sensors 1646. Sensors can include accelerometers, compass, gyrometer, pressure sensors, audio sensors, light sensors, barometers, and the like. Sensors 1646 can be used to sense location aspects, such as auditory or light signatures of a location.

In some embodiments, device 1600 can include a GPS receiver, sometimes referred to as a GPS unit 1648. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 1618 run various software components stored in medium 1602 to perform various functions for device 1600. In some embodiments, the software components include an operating system 1622, a communication module 1624 (or set of instructions), a location module 1626 (or set of instructions), a ranging module 1628 that is used as part of ranging operation described herein, and other application programs 1634 (or set of instructions).

Operating system 1622 can be any suitable operating system, including iOS, Mac OS, Darwin, Real Time Operating System (RTXC), LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 1624 facilitates communication with other devices over one or more external ports 1636 or via wireless circuitry 1608 and includes various software components for handling data received from wireless circuitry 1608 and/or external port 1636. External port 1636 (e.g., universal serial bus (USB), FireWire, Lightning connector, 60-pin connector, etc.) is adapted for coupling directly to other devices or indirectly over a network (e.g., the Internet, wireless local area network (LAN), etc.).

Location/motion module 1626 can assist in determining the current position (e.g., coordinates or other geographic location identifiers) and motion of device 1600. Modern positioning systems include satellite-based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 1626 receives data from GPS unit 1648 and analyzes the signals to determine the current position of the mobile device. In some embodiments, location/motion module 1626 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 1608 and is passed to location/motion module 1626. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 1600 based on the position coordinates of the corresponding transmitters. Regardless of the specific location technology used, location/motion module 1626 receives information from which a location fix can be derived, interprets that information, and returns location information, such as geographic coordinates, latitude/longitude, or other location fix data Ranging module 1628 can send/receive ranging messages to/from an antenna, e.g., connected to wireless circuitry 1608. The messages can be used for various purposes, e.g., to identify a sending antenna of a device, determine timestamps of messages to determine a distance of mobile device 1600 from another device. Ranging module 1628 can exist on various processors of the device, e.g., an always-on processor (AOP), a UWB chip, and/or an application processor. For example, parts of ranging module 1628 can determine a distance on an AOP, and another part of the ranging module can interact with a sharing module, e.g., to display a position of the other device on a screen in order for a user to select the other device to share a data item. Ranging module 1628 can also interact with a reminder module that can provide an alert based on a distance from another mobile device.

The one or more applications 1634 on device 1600 can include any applications installed on the device 1600, including without limitation, a browser, address book, contact list, email, instant messaging, social networking, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

I/O subsystem 1606 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use light emitting diode (LED), liquid crystal display (LCD) technology, or light emitting polymer display (LPD) technology, although other display technologies can be used in other embodiments.

In some embodiments, I/O subsystem 1606 can include a display and user input devices such as a keyboard, mouse, and/or trackpad. In some embodiments, I/O subsystem 1606 can include a touch-sensitive display. A touch-sensitive display can also accept input from the user based at least part on haptic and/or tactile contact. In some embodiments, a touch-sensitive display forms a touch-sensitive surface that accepts user input. The touch-sensitive display/surface (along with any associated modules and/or sets of instructions in computer-readable medium 1602) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, I/O subsystem 1606 can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 1600 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium, such as a compact disk (CD) or DVD (digital versatile disk), flash memory, and the like. The computer readable medium may be any combination of such storage or transmission devices.

Computer programs incorporating various features of the present disclosure may be encoded on various computer readable storage media; suitable media include magnetic disk or tape, optical storage media, such as compact disk (CD) or DVD (digital versatile disk), flash memory, and the like. Computer readable storage media encoded with the program code may be packaged with a compatible device or provided separately from other devices. In addition, program code may be encoded and transmitted via wired optical, and/or wireless networks conforming to a variety of protocols, including the Internet, thereby allowing distribution, e.g., via Internet download. Any such computer readable medium may reside on or within a single computer product (e.g., a solid state drive, a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering, sharing, and use of data, including an authentication tag and data from which the tag is derived. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to authenticate another device, and vice versa to control which devices ranging operations may be performed. Further, other uses for personal information data that benefit the user are also contemplated by the present disclosure. For instance, health and fitness data may be shared to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing content and performing ranging, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

Although the present disclosure has been described with respect to specific embodiments, it will be appreciated that the disclosure is intended to cover all modifications and equivalents within the scope of the following claims.

All patents, patent applications, publications, and descriptions mentioned herein are incorporated by reference in their entirety for all purposes. None is admitted to be prior art.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure. The use of "or" is intended to mean an "inclusive or," and not an "exclusive or" unless specifically indicated to the contrary. Reference to a "first" component does not necessarily require that a second component be provided. Moreover reference to a "first" or a "second" component does not limit the referenced component to a particular location unless expressly stated. The term "based on" is intended to mean "based at least in part on."

Disjunctive language such as the phrase "at least one of X, Y, or Z," unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method for communicating with an access device, the method comprising performing, by a mobile device:

receiving a plurality of polling messages, each polling message including an identifier of a respective access device of a plurality of access devices that transmit the polling message, wherein each polling message of the plurality of polling messages is transmitted during a polling phase;

selecting a portion of a timeslot of a plurality of timeslots in a response phase of a communication session, wherein the selecting is based on criteria associated with the plurality of polling messages;

transmitting a response message to a particular access device of the plurality of access devices during the portion of the timeslot of the response phase;

receiving, from the particular access device and during a third phase, an assignment message including an assigned timeslot for the response phase of a future session;

performing secure ranging with the particular access device during the future session using the assigned timeslot; and providing an access credential to the particular access device responsive to a location determined using the secure ranging, where the location is a position relative to an entryway of the particular access device.

2. The method of claim 1, further comprising:

selecting a portion of the timeslot based on a time of arrival for the plurality of polling messages, and wherein the response message is transmitted during the portion of the timeslot.

3. The method of claim 1, wherein selecting the portion of the timeslot is based on a received message strength of each of the plurality of polling messages, and wherein the response message is transmitted during the portion of the timeslot.

4. The method of claim 1, further comprising: receiving scheduling information specifying which portion of each of the plurality of timeslots is assigned to which access device to listen for the response message.

5. The method of claim 4, wherein the scheduling information is received in a polling message.

6. The method of claim 1, wherein each portion of the timeslot corresponds to a respective access device of the plurality of access devices.

7. The method of claim 1, wherein the response message includes a public-key of the mobile device.

8. The method of claim 1, wherein the assignment message includes an access device public-key.

9. The method of claim 1, wherein the assignment message includes an instruction to perform secure ranging with an assigned access device of the plurality of access devices.

10. A method for secure ranging comprising performing, by a mobile device:

receiving an assignment message from a first access device of a plurality of access devices, the assignment message identifying a first assigned response-slot of a plurality of response-slots of a response phase of a future ranging session;

receiving, a polling message from the first access device, the polling message including access device identification information;

determining a reception time of the polling message for the first access device;

selecting the first assigned response-slot based on criteria associated with the polling message to direct a first response message to the first access device;

transmitting first response message during the first assigned response-slot, the first response message including a mobile device identifier and timing information corresponding to the reception time of the polling message from the first access device;

receiving an access message from the first access device; and responsive to the access message and at a location relative to an entryway of the first access device, providing an access credential to the first access device of the plurality of access devices.

11. The method of claim 10, wherein the timing information comprises a reply time comprising a difference between the reception time of the polling message and a transmit time of the first response message.

12. The method of claim 10, wherein the access message includes a trigger message instructing the mobile device to provide the access credential.

13. The method of claim 10, wherein the access message includes information indicating a distance between the mobile device and the first access device, and wherein the access credential is provided to the first access device based on the information indicating the distance.

14. The method of claim 13, wherein the information indicating the distance includes the distance as determined by the first access device.

15. The method of claim 10, wherein the first response message is encrypted with an access device public-key.

16. The method of claim 15, further comprising decrypting the access message using a private-key of the mobile device.

17. The method of claim 10, wherein the mobile device performs the secure ranging with the first access device and a second access device of the plurality of access devices.

18. The method of claim 17, wherein an assignment message from the second access device identifies a second assigned response-slot of the plurality of response-slots, the second assigned response-slot corresponding to the second access device.

19. The method of claim 18, further comprising:

transmitting, to the second access device, a second response message during the second assigned response-slot.

20. The method of claim 10, wherein the first response message is transmitted to a passive receiver of the first access device.

21. The method of claim 10, wherein the access credential is provided to a passive receiver of the first access device.

22. A computing device for communicating with an access device, the computing device comprising:

one or more memories; and one or more processors in communication with the one or more memories and configured to execute instructions stored in the one or more memories to performing operations comprising:

receiving a plurality of polling messages, each polling message including an identifier of a respective access device of a plurality of access devices that transmit the polling message, wherein each polling message of the plurality of polling messages is transmitted during a polling phase;

selecting a portion of a timeslot of a plurality of timeslots in a response phase of a communication session, wherein the selecting is based on criteria associated with the plurality of polling messages;

transmitting a response message to a particular access device of the plurality of access devices during the portion of the timeslot of the response phase;

receiving, from the particular access device and during a third phase, an assignment message including an assigned timeslot for the response phase of a future session;

performing secure ranging the particular access device during the future session using the assigned timeslot; and providing an access credential to the particular access device responsive to a location determined using the secure ranging, where the location is a position relative to an entryway of the particular access device.

23. The computing device of claim 22, wherein selecting the portion of the timeslot is based on a time of arrival for the plurality of polling messages, and wherein the response message is transmitted during the portion of the timeslot.

24. The computing device of claim 22, wherein selecting the portion of the timeslot is based on a received message strength of each of the plurality of polling messages, and wherein the response message is transmitted during the portion of the timeslot.

25. The computing device of claim 22, wherein the operations further comprise receiving scheduling information specifying which portion of each of the plurality of timeslots is assigned to which access device to listen for the response message.

26. The computing device of claim 25, wherein the scheduling information is received in a polling message.

27. The computing device of claim 22, wherein the timeslot comprises a plurality of portions, where each portion of the timeslot corresponds to a respective access device of the plurality of access devices.

28. The computing device of claim 22, wherein the assignment message includes an access device public-key.

29. The computing device of claim 22, wherein the response message includes a public-key of the computing device.

30. A computing device for secure ranging, the computing device comprising:

one or more memories; and one or more processors in communication with the one or more memories and configured to execute instructions stored in the one or more memories to performing operations comprising:

receiving an assignment message from a first access device of a plurality of access devices, the assignment message identifying a first assigned response-slot of a plurality of response-slots of a response phase of a future ranging session;

receiving, a polling message from the first access device, the polling message including access device identification information;

determining a reception time of the polling message for the first access device;

selecting the first assigned response-slot based on criteria associated with the polling message to direct a first response message to the first access device;

transmitting the first response message during the first assigned response-slot, the first response message including a mobile device identifier and timing information corresponding the reception time of the polling message from the first access device;

receiving, from a first access device of the plurality of access devices, an access message from the first access device; and responsive to the access message and at a location relative to an entryway of the first access device, providing an access credential to the first access device of the plurality of access devices.

31. The computing device of claim 30, wherein the timing information comprises a reply time comprising a difference between the reception time of the polling message and a transmit time of the first response message.

32. The computing device of claim 30, wherein the access message includes a trigger message instructing the computing device to provide the access credential.

33. The computing device of claim 30, wherein the access message includes information indicating a distance between the computing device and the first access device, and wherein the access credential is provided to the first access device based on the information indicating the distance.

34. The computing device of claim 33, wherein the information indicating the distance includes the distance as determined by the first access device.

35. The computing device of claim 30, wherein the first response message is encrypted with an access device public-key.

36. The computing device of claim 35, wherein the operations further comprise decrypting the access message using a private-key of the computing device.

37. The computing device of claim 30, wherein the computing device performs the secure ranging with the first access device and a second access device of the plurality of access devices.

38. The computing device of claim 37, wherein an assignment message from the second access device identifies a second assigned response-slot of the plurality of response-slots, the second assigned response-slot corresponding to the second access device.

39. The computing device of claim 38, wherein the operations further comprise transmitting, to the second access device, a second response message during the second assigned response-slot.

40. The computing device of claim 30, wherein the first response message is transmitted to a passive receiver of the first access device.

* * * * *